(12) United States Patent
Nomura et al.

(10) Patent No.: US 10,757,337 B2
(45) Date of Patent: Aug. 25, 2020

(54) INFORMATION PROCESSING APPARATUS AND INFORMATION PROCESSING METHOD TO CONTROL EXPOSURE FOR IMAGING THE EYE

(71) Applicant: SONY CORPORATION, Tokyo (JP)

(72) Inventors: Eisuke Nomura, Tokyo (JP); Yoshiaki Iwai, Tokyo (JP); Yuki Yamamoto, Chiba (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/097,683

(22) PCT Filed: Mar. 8, 2017

(86) PCT No.: PCT/JP2017/009211
§ 371 (c)(1),
(2) Date: Oct. 30, 2018

(87) PCT Pub. No.: WO2017/195450
PCT Pub. Date: Nov. 16, 2017

(65) Prior Publication Data
US 2019/0158717 A1    May 23, 2019

(30) Foreign Application Priority Data

May 10, 2016    (JP) ................................ 2016-094319

(51) Int. Cl.
*H04N 5/235* (2006.01)
*G02B 27/02* (2006.01)
(Continued)

(52) U.S. Cl.
CPC ........... *H04N 5/2352* (2013.01); *G02B 27/02* (2013.01); *G03B 7/097* (2013.01); *G03B 15/02* (2013.01);
(Continued)

(58) Field of Classification Search
CPC .. H04N 5/2352; H04N 5/2353; H04N 5/2351; H04N 5/232; G06K 9/00604;
(Continued)

(56) References Cited

U.S. PATENT DOCUMENTS

| | | | |
|---|---|---|---|
| 2004/0170304 A1* | 9/2004 | Haven | A61B 3/113 382/115 |
| 2005/0253937 A1* | 11/2005 | Moholt | H04N 5/2352 348/229.1 |
| 2010/0070988 A1* | 3/2010 | Cohen | G06K 9/00604 725/10 |
| 2013/0027664 A1* | 1/2013 | Kishida | A61B 3/14 351/206 |

(Continued)

FOREIGN PATENT DOCUMENTS

| | | | |
|---|---|---|---|
| EP | 2338416 A1 | 6/2011 | |
| JP | 5230748 B2 | 7/2013 | |

(Continued)

OTHER PUBLICATIONS

International Search Report and Written Opinion of PCT Application No. PCT/JP2017/009211, dated May 16, 2017, 09 pages of ISRWO.

*Primary Examiner* — Marnie A Matt
(74) *Attorney, Agent, or Firm* — Chip Law Group

(57) ABSTRACT

An information processing device including a light source control unit that controls a light source that irradiates an eye with light; and an exposure control unit that controls exposure for imaging the eye. The light source control unit sets a state of the light source to an on state or an off state at a time when the exposure is not performed.

13 Claims, 15 Drawing Sheets

(51) Int. Cl.
*H04N 5/232* (2006.01)
*G03B 7/097* (2006.01)
*G03B 15/02* (2006.01)
*G03B 17/00* (2006.01)
*G03B 15/05* (2006.01)
*G06K 9/00* (2006.01)

(52) U.S. Cl.
CPC ............. *G03B 15/05* (2013.01); *G03B 17/00* (2013.01); *G06K 9/00604* (2013.01); *H04N 5/232* (2013.01); *H04N 5/2351* (2013.01); *H04N 5/2353* (2013.01)

(58) Field of Classification Search
CPC ........ G03B 17/00; G03B 15/05; G03B 15/02; G03B 7/097; G02B 27/02
USPC .......................................................... 348/78
See application file for complete search history.

(56) References Cited

U.S. PATENT DOCUMENTS

| | | | |
|---|---|---|---|
| 2014/0043459 | A1 | 2/2014 | Tsukizawa et al. |
| 2016/0198103 | A1* | 7/2016 | Tanaka ................... H04N 9/045 348/164 |
| 2016/0219208 | A1* | 7/2016 | Horesh ............... H04N 5/23219 |
| 2016/0274659 | A1* | 9/2016 | Caraffi .................... G06F 3/013 |
| 2016/0309084 | A1* | 10/2016 | Venkataraman ... H04N 5/23232 |

FOREIGN PATENT DOCUMENTS

| | | |
|---|---|---|
| JP | 2015-175971 A | 10/2015 |
| JP | 2016-049258 A | 4/2016 |
| JP | 2016-051317 A | 4/2016 |
| WO | 2010/035472 A1 | 4/2010 |

* cited by examiner

FIG. 4

BLINKING PATTERN

INFORMATION PROCESSING APPARATUS AND INFORMATION PROCESSING METHOD TO CONTROL EXPOSURE FOR IMAGING THE EYE

CROSS REFERENCE TO RELATED APPLICATIONS

This application is a U.S. National Phase of International Patent Application No. PCT/JP2017/009211 filed on Mar. 8, 2017, which claims priority benefit of Japanese Patent Application No. JP 2016-094319 filed in the Japan Patent Office on May 10, 2016. Each of the above-referenced applications is hereby incorporated herein by reference in its entirety.

TECHNICAL FIELD

The present disclosure relates to an information processing apparatus and an information processing method.

BACKGROUND ART

In recent years, along with the development of line of sight estimation techniques, research and development for improving the accuracy of the line of sight estimation have been performed. In the case of the line of sight estimation technique in which an eyeball is irradiated with light and a reflection point (a bright spot) generated by the light is used, it is required to control a light source according to the exposure time. Here, Prior Literature 1 discloses a technique of setting a control time of the light source according to the exposure time.

CITATION LIST

Patent Literature

Patent Literature 1: JP 2010-262224A

DISCLOSURE OF INVENTION

Technical Problem

However, in a case in which a state of the light source is switched during the exposure time, it is feared that a suitable imaging result related to the bright spot may not be obtained. For example, in a case in which it is desired that no bright spot be imaged in a certain frame, when the state of the light source is switched to the off state after a delay of an exposure start of the corresponding frame, a bright spot may appear on the captured image of the corresponding frame. In addition, in a case in which it is desired that an image of the bright spot be captured in a certain frame, when the state of the light source is switched to the on state after a delay of the exposure start of the corresponding frame, it may be insufficient for the brightness of a reflection point in the captured image to be recognized as the bright spot.

Therefore, the present disclosure has been made in view of the above, and the present disclosure proposes a new and improved information processing apparatus capable of obtaining a more suitable imaging result related to a bright spot.

Solution to Problem

According to the present disclosure, there is provided an information processing apparatus including: a light source control unit configured to control a light source that irradiates an eye with light; and an exposure control unit configured to control exposure for imaging the eye. The light source control unit sets a state of the light source to an on state or an off state at a time when the exposure is not performed.

In addition, according to the present disclosure, there is provided an information processing method that is performed by an information processing apparatus, the information processing method including: controlling a light source that irradiates an eye with light; controlling exposure for imaging the eye using the light; and setting a state of the light source to an on state or an off state at a time when the exposure is not performed.

Advantageous Effects of Invention

As described above, according to the present disclosure, it is possible to obtain a more suitable imaging result related to a bright spot.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a schematic diagram illustrating an example of a blinking pattern of a light source.

MODE(S) FOR CARRYING OUT THE INVENTION

Figure 1:
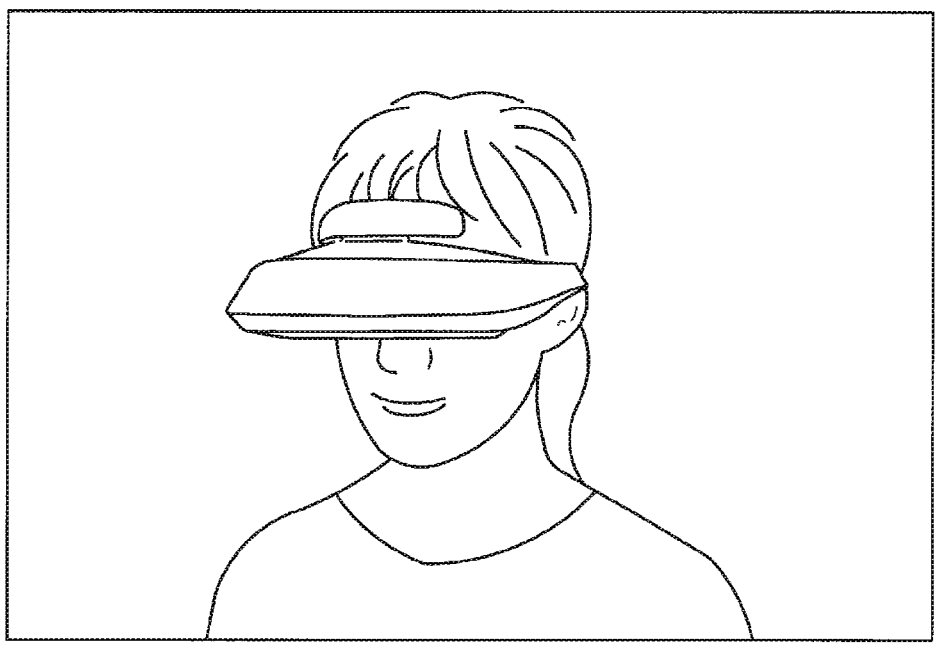
FIG. 1 is a schematic diagram of a head mounted display according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Introduction
2. Embodiment of the present disclosure
2.1. Overview of embodiment of the present disclosure
2.2. Configuration of head mounted display
2.3. Operation of head mounted display
3. Light source control based on imaging processing information
3.1. Overview of light source control based on imaging processing information
3.2. Light source control flow based on imaging processing information
3.3. First modification example
3.4. Second modification example
3.5. Summary of embodiment of the present disclosure
4. Hardware configuration of head mounted display
5. Supplement

1. Introduction

First, an overview of a line of sight estimation technique will be described. The line of sight estimation technique is a technique for estimating a line of sight by detecting a state of an eyeball including a position or movement of the eyeball. The line of sight estimation technique is able to be utilized for various purposes or products. For example, a layout of a product shelf can be improved by estimating a line of sight of a user with respect to a product displayed on the product shelf of a retail store and calculating the frequency or time at which the product is viewed. In addition, the effect of an outdoor advertisement can be measured by estimating a line of sight of a user with respect to the outdoor advertisement and calculating the viewing frequency or time. In addition, a user can designate a point to be operated and operate a head mounted display without using a pointing device if a line of sight of a user with respect to a display of the head mounted display is estimated.

Along with dissemination of services or products utilizing such a line of sight estimation technique, development of sensing devices and imaging devices, or the like, and line of sight estimation techniques of various methods are being researched and developed. For example, a line of sight estimation technique of the following technique may be provided.

Pupil cornea reflex method: A technique in which a cornea is irradiated with light, a cornea curvature center point is calculated by associating a bright spot on the cornea with a light source, and a line of sight is estimated on the basis of the cornel curvature center point and a center point of a pupil.

Sclera reflection method: A technique in which a boundary between the sclera and the cornea is irradiated with light and the line of sight is estimated on a basis of a difference in a reflection ratio between the sclera and the cornea.

Double Purkinje method: A technique in which the line of sight is estimated on a basis of a relative relationship between two reflected lights from a cornea surface and a back surface of a crystalline lens.

Image processing method: A technique in which the line of sight is estimated by performing some kind of imaging processing on a captured image of an eyeball.

Search coil method: A technique in which a special contact lens provided with a coil is attached to the eyeball, an eye movement is measured by a principle of electromagnetic induction, and thus the line of sight is estimated.

Electro oculography (EOG) method: A technique in which the line of sight is estimated on a basis of a change in a potential by a rotation of the eyeball.

2. Embodiment of the Present Disclosure

[2.1. Overview of Embodiment of the Present Disclosure]

In an embodiment of the present disclosure, a head mounted display in which a line of sight estimation is performed by using the pupil cornea reflex method among the line of sight estimation technologies described above will be described.

First, an overview of the head mounted display 100 according to an embodiment of the present disclosure will be described with reference to FIG. 1. FIG. 1 is a schematic diagram of the head mounted display 100 according to an embodiment of the present disclosure. As shown in FIG. 1, the head mounted display 100 according to an embodiment of the present disclosure is an information processing apparatus that is attached to a head of a user and a generated image is displayed on a display in front of the user's eyes. The head mounted display shown in FIG. 1 is a shield type head mounted display in which the entire view of a wearer is covered, but an arbitrary type may be applied to a head mounted display capable of performing the line of sight estimation by the pupil cornea reflex method. For example, the head mounted display 100 according to an embodiment of the present disclosure may be an open type head mounted display in which the entire view of the wearer is not covered.

Figure 2:
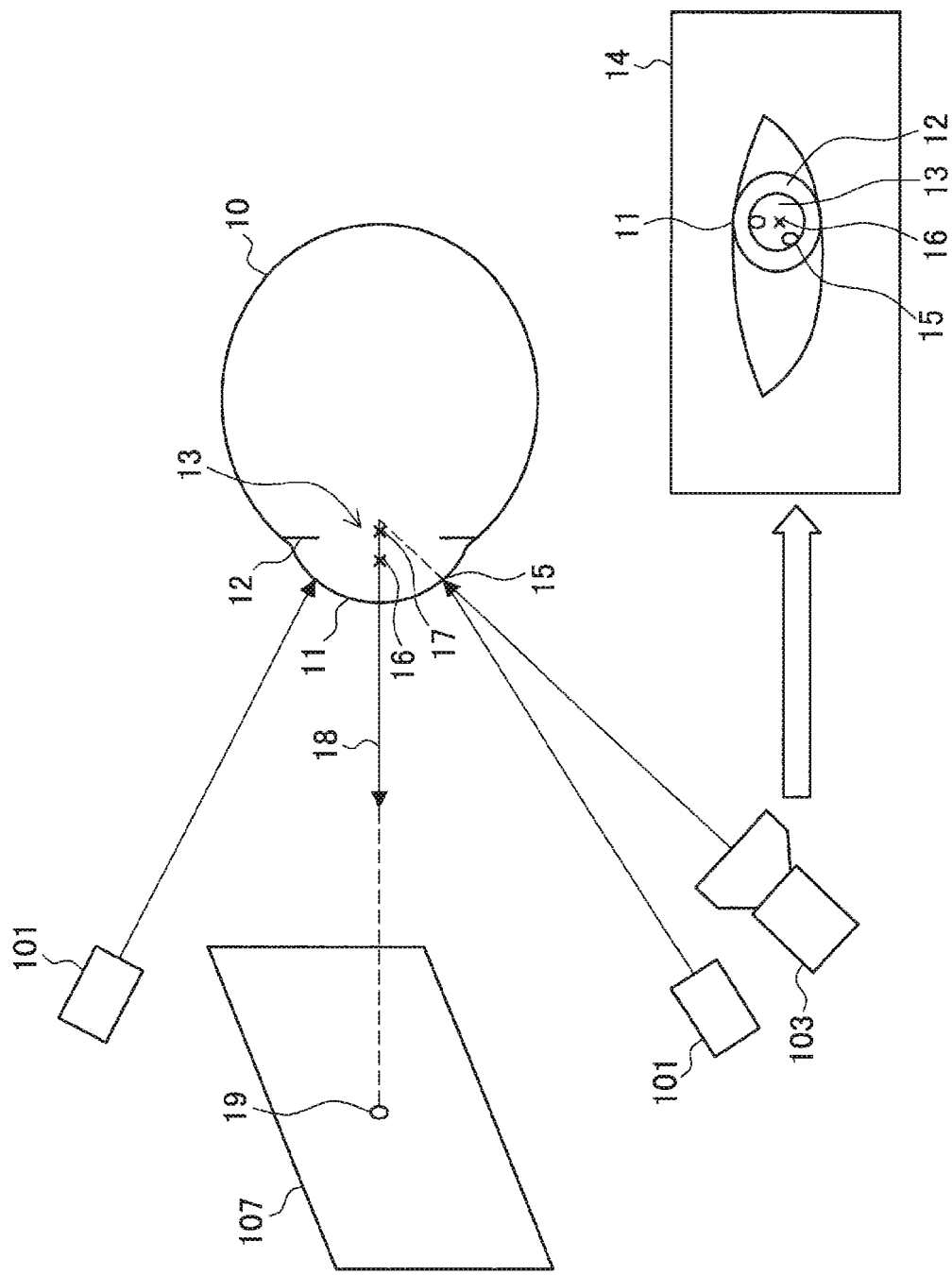
FIG. 2 is a schematic diagram of line of sight estimation by the head mounted display according to an embodiment of the present disclosure.

Next, an overview of the line of sight estimation technique using the head mounted display 100 according to an embodiment of the present disclosure will be described with reference to FIG. 2. FIG. 2 is a schematic diagram of line of sight estimation by the head mounted display according to an embodiment of the present disclosure. FIG. 2 shows a plurality of light sources 101, an imaging unit 103, and a display unit 107 that are parts of configuration elements of the head mounted display 100, and an eyeball 10 on which the line of sight estimation is performed. Although only two light sources 101 are shown in FIG. 2, any number of light sources 101 may be provided as long as a plurality of light sources 101 are provided. In addition, FIG. 2 also schematically shows a captured image 14 captured by the imaging unit 103. Further, FIG. 2 also schematically shows a cornea 11, an iris 12, and a pupil 13 of the eyeball 10.

In the line of sight estimation by the head mounted display 100 according to an embodiment of the present disclosure, the eyeball 10 is irradiated with light from the plurality of light sources 101 and the imaging unit 103 images the eyeball 10. In the captured image 14 captured by the imaging unit 103, a bright spot 15 (also referred to as a Purkinje image) that is a reflection point of the light or the pupil 13 is imaged on the cornea 11.

Subsequently, the plurality of light sources 101 and the bright spot 15 generated by light emitted from the light source 101 and reflected on the cornea are associated with each other. A cornea curvature center point 17 is calculated on the basis of the association. A method of calculating the cornea curvature center point 17 will be described later. In addition, a pupil center point 16 is calculated by analyzing the pupil 13 imaged by the imaging unit 103. A method of calculating the pupil center point 16 will be described later. In addition, an optical axis that is a vector directed from the calculated cornea curvature center point 17 to the pupil center point 16 is obtained. Next, a visual axis 18 that is the line of sight of the user is obtained by suitably correcting the optical axis. A method of correcting the optical axis will be described later. Next, coordinates of a line of sight estimation point 19 at which the visual axis 18 and the display unit 107 intersect with each other are calculated on a basis of a positional relationship between the display unit 107 and the eyeball 10 in a three-dimensional space. Details of the line of sight estimation method will be described later.

[2.2. Configuration of Head Mounted Display]

Figure 3:
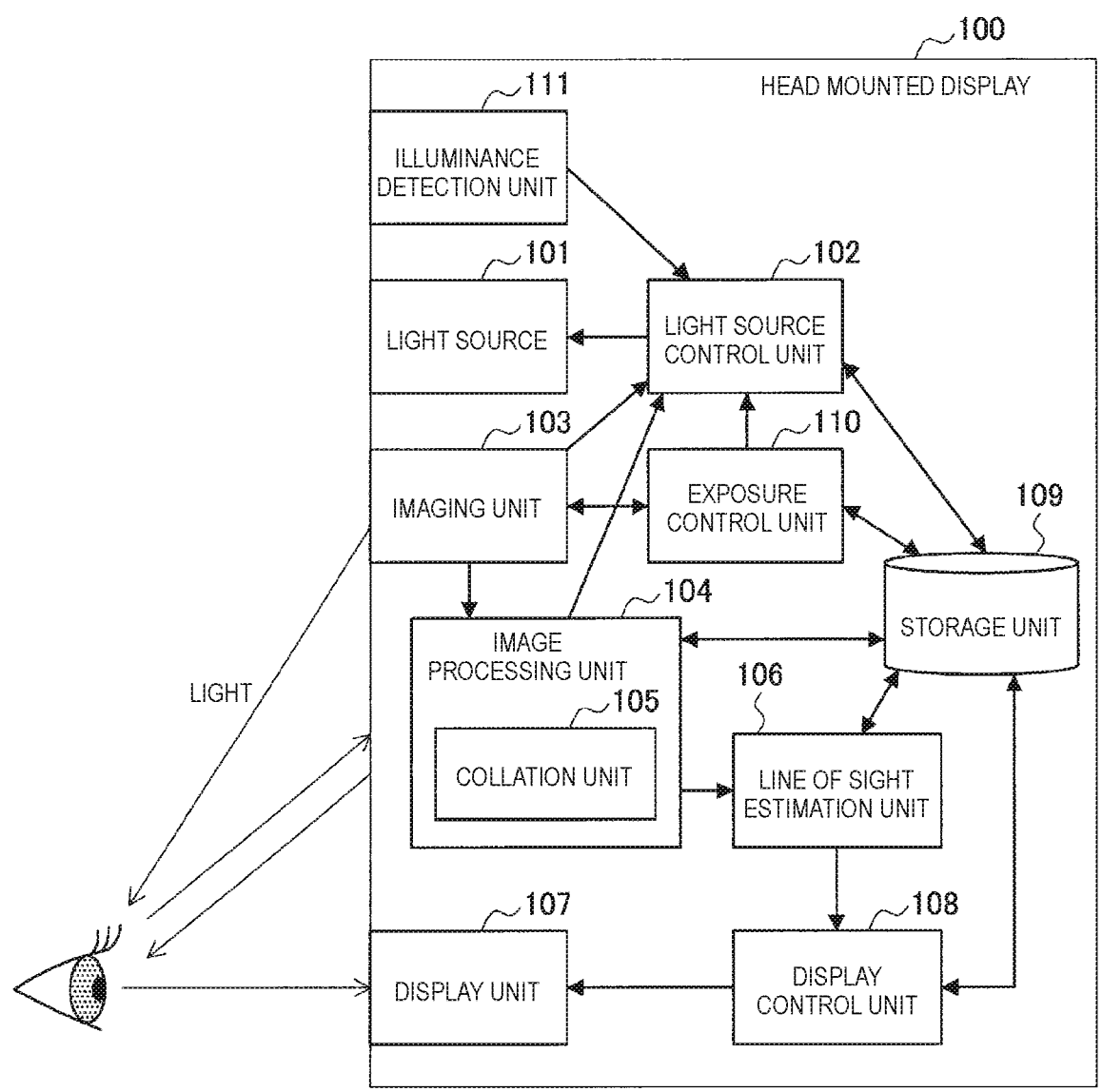
FIG. 3 is a block diagram illustrating a configuration of the head mounted display according to an embodiment of the present disclosure.

The overview of the line of sight estimation technique using the head mounted display 100 according to an embodiment of the present disclosure has been described above. Next, the configuration of the head mounted display 100 according to an embodiment of the present disclosure will be described with reference to FIG. 3. FIG. 3 is a block diagram illustrating the configuration of the head mounted display 100 according to an embodiment of the present disclosure. The head mounted display 100 includes a light source 101, a light source control unit 102, an imaging unit 103, an image processing unit 104, a collation unit 105, a line of sight estimation unit 106, a display unit 107, a display control unit 108, a storage unit 109, an exposure control unit 110, and an illuminance detection unit 111. The collation unit 105 is one module of the image processing unit 104. A plurality of light sources 101 are provided.

The light source 101 irradiates the eyeball 10 with light. Specifically, the light source 101 is switched between an on state and an off state under control of the light source control unit 102, and the light source 101 in the on state irradiates the eyeball 10 with the light. In the head mounted display 100 according to an embodiment of the present disclosure, the plurality of light sources 101 are provided at different positions, and each light source 101 irradiates the eyeball 10 with the light. Therefore, a plurality of bright spots 15 are generated on the cornea.

The imaging unit 103 images the eyes of the user and generates captured image information. Specifically, the imaging unit 103 is provided at a position where it is possible to image a movement of the eye, the bright spot 15, and the like, and generates the captured image information corresponding to a captured image by performing exposure and reading the captured image. In addition, the imaging unit 103 images one eye or both eyes of the user. An aperture value or an exposure time (a shutter speed) when the imaging unit 103 performs the imaging processing are set on the basis of the imaging processing information provided by the exposure control unit 110. The imaging unit 103 provides the captured image information to the image processing unit 104 and the exposure control unit 110. The provided captured image information is used in generating the imaging processing information by the exposure control unit 110 such as detection processing of the bright spot 15 or the pupil 13 by the image processing unit 104.

In addition, the imaging unit 103 provides a synchronization signal to the light source control unit 102, thereby enabling synchronization of the imaging processing and the light source control. For example, the imaging unit 103 provides the synchronization signal to the light source control unit 102 at a timing at which reading processing of the captured image is started. However, this is only an example, and the imaging unit 103 may provide the synchronization signal to the light source control unit 102 at a timing of arbitrary processing. The light source control unit 102 is able to control the light source 101 in synchronization with the imaging processing by the imaging unit 103 and the exposure control processing by the exposure control unit 110, by the synchronization signal.

In addition, the imaging unit 103 generates a reading completion notification at a timing at which the reading processing of the captured image is completed and provides the corresponding notification to the light source control unit 102 as the imaging processing information. In addition, the imaging unit 103 generates an exposure completion notification at the timing at which the exposure is completed and provides the corresponding notification to the light source control unit 102 as the imaging processing information. The provided reading completion notification or exposure completion notification is used in controlling the light source 101 by the light source control unit 102.

The exposure control unit 110 performs automatic exposure (AE) control that automatically changes a setting related to the exposure according to a brightness of a subject. Specifically, the exposure control unit 110 generates the imaging processing information including the information related to the aperture value or the exposure time in imaging processing after a frame next to a frame during the imaging processing, on the basis of the captured image information acquired from the imaging unit 103. In addition, the exposure control unit 110 provides the imaging processing information to the imaging unit 103 and the light source control unit 102. The provided imaging processing information is used in the imaging processing by the imaging unit 103 and the control of the light source 101 by the light source control unit 102. Here, the exposure control unit 110 may perform exposure control by settings of the aperture value, the exposure time, or the like input by the user (hereinafter referred to as "manual exposure control") rather than performing the automatic exposure control.

The image processing unit 104 analyzes the captured image information provided from the imaging unit 103. Specifically, the image processing unit 104 detects the bright spot 15 or the pupil 13 by analyzing the captured image information and generates bright spot related information including information related to a position of the bright spot 15 and information related to a position of the pupil 13. Details of a method of detecting the bright spot 15 or the pupil 13 will be described later.

Next, the image processing unit 104 provides the above-described bright spot related information to the light source control unit 102, the collation unit 105, and the line of sight estimation unit 106. The provided bright spot related information is used in associating the bright spot 15 and the light source 101 with each other by the collation unit 105 and estimating the optical axis by the line of sight estimation unit 106. In addition, the provided bright spot related information is used when the light source control unit 102 controls the light source 101 on the basis of a predicted position of the bright spot 15 in a second modification example to be described later.

In addition, the image processing unit 104 provides the above-described pupil related information to the line of sight estimation unit 106. The provided pupil related information is used in estimating the optical axis by the line of sight estimation unit 106.

The collation unit 105 associates the light source 101 with the bright spot 15 generated by the light radiated from the light source 101. Specifically, the collation unit 105 associates the light source 101 with the bright spot 15 on a basis of the bright spot related information provided from the image processing unit 104 and a blinking pattern of the plurality of light sources 101 provided from the light source control unit 102. In addition, the collation unit 105 generates bright spot light source correspondence information in which identification information such as an ID is given to the information in which the light source 101 and the bright spot 15 are associated with each other. A method of associating the light source 101 and the bright spot 15 with each other will be described later.

In addition, the collation unit 105 provides the bright spot light source correspondence information to the line of sight estimation unit 106. The provided bright spot light source correspondence information is used in estimating the optical axis by the line of sight estimation unit 106.

The line of sight estimation unit 106 estimates the line of sight on the basis of various pieces of information. Specifically, the line of sight estimation unit 106 estimates the optical axis on the basis of the bright spot related information and the pupil related information provided from the image processing unit 104 and the bright spot light source correspondence information provided from the collation unit 105. In addition, the line of sight estimation unit 106 estimates the visual axis 18 that is the line of sight of the user by correcting the optical axis, generates line of sight estimation information including information related to the visual axis 18, and provides the line of sight estimation information to the display control unit 108. The provided line of sight estimation information is used for controlling the display unit 107 by the display control unit 108.

The display unit 107 displays various pieces of information. Specifically, the display unit 107 visually notifies the user of the various pieces of the information by displaying the various pieces of information in various formats such as an image, text, and a graph, under control of the display control unit 108. Various types of content may be included in the various pieces of the information. In addition, the display unit 107 displays a line of sight estimation point 19 of the user under the control of the display control unit 108.

The display control unit 108 controls the display unit 107. Specifically, the display control unit 108 determines content of the information to be displayed on the display unit 107 on the basis of processing of an activated application and displays the information on the display unit 107. In addition, the display control unit 108 calculates the coordinates of the line of sight estimation point 19 at which the visual axis 18 and the display unit 107 intersect with each other on the basis of the line of sight estimation information provided from the line of sight estimation unit 106 and displays a point at the coordinates on the display unit 107.

The light source control unit 102 controls the plurality of light sources 101. Specifically, the light source control unit 102 sets the state of each light source 101 to the on state or the off state in each frame on the basis of the blinking pattern that is the information related to the on or off state of the plurality of light sources 101 in each frame and the imaging processing information provided from the exposure control unit 110. A method of setting the state of each light source 101 to the on state or the off state by the light source control unit 102 will be described later. In addition, the light source control unit 102 provides the blinking pattern to the collation unit 105. The provided blinking pattern is used in associating the bright spot 15 and the light source 101 with each other by the collation unit 105.

Figure 4:
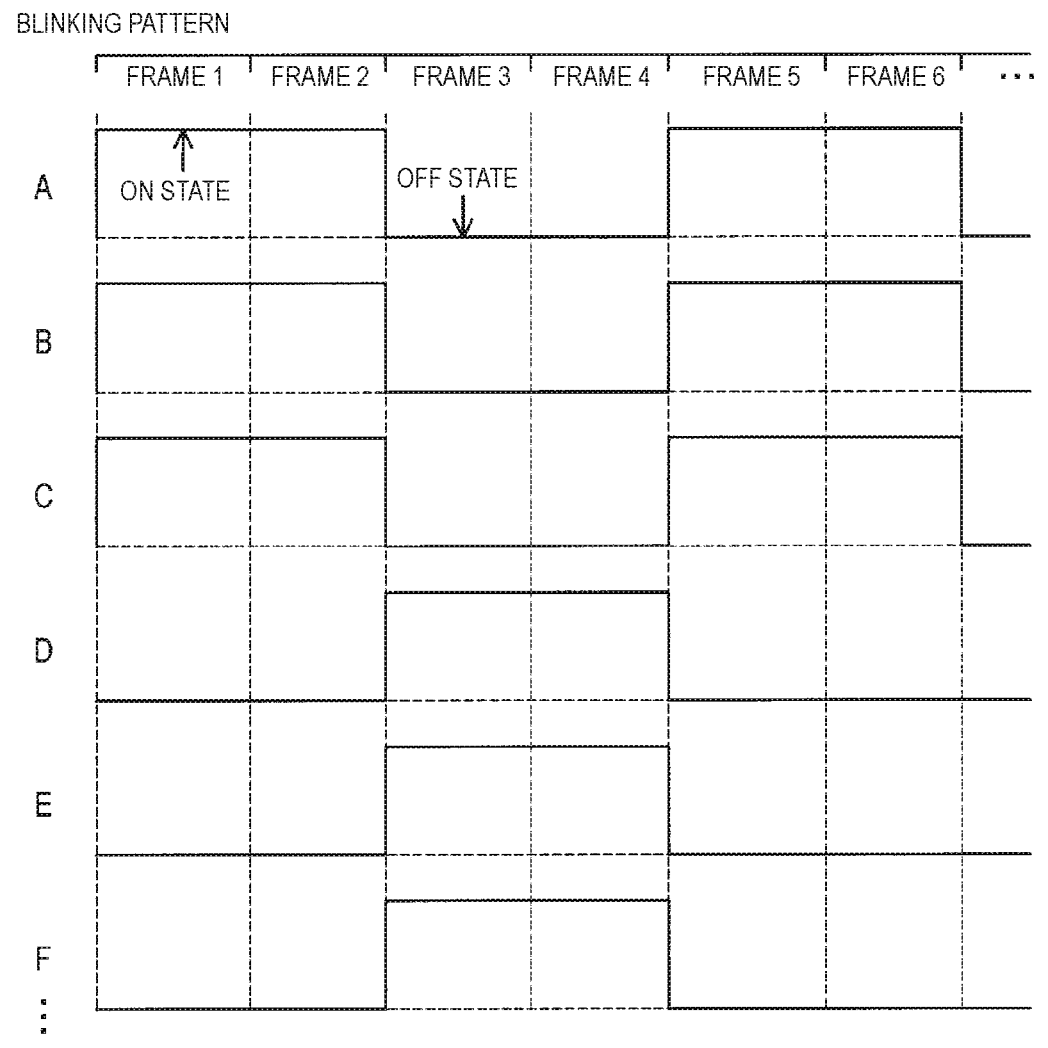

Here, the blinking pattern described above with reference to FIG. 4 will be described. FIG. 4 is a schematic diagram illustrating an example of the blinking pattern of the light source 101. As shown in FIG. 4, the blinking pattern includes information related to the light source 101 provided in the head mounted display 100 and the state (the on state or the off state) of each light source 101 in each frame. The light source control unit 102 is able to select a blinking pattern to be used from a plurality of blinking patterns of which patterns are different and control the light source 101 using the selected blinking pattern. Of course, only one blinking pattern may be provided. In addition, the light source control unit 102 is also able to suitably change the blinking pattern.

The storage unit 109 stores various pieces of information used for the line of sight estimation, the light source control, the exposure control, the display control, or the like. Specifically, the storage unit 109 may acquire and store the captured image information, the bright spot related information, the pupil related information, the bright spot light source correspondence information, the imaging processing information, the line of sight estimation information, and the blinking pattern described above. In addition, the storage unit 109 stores various parameters used in the line of sight estimation, content information displayed on the display unit 107, and the like.

The illuminance detection unit 111 detects an illuminance of an imaging environment and generates illuminance information. In addition, the illuminance detection unit 111 provides the illuminance information to the light source control unit 102. The provided illuminance information is used in setting a luminance of the light source 101 by the light source control unit 102.

[2.3. Operation of Head Mounted Display]

Figure 5:
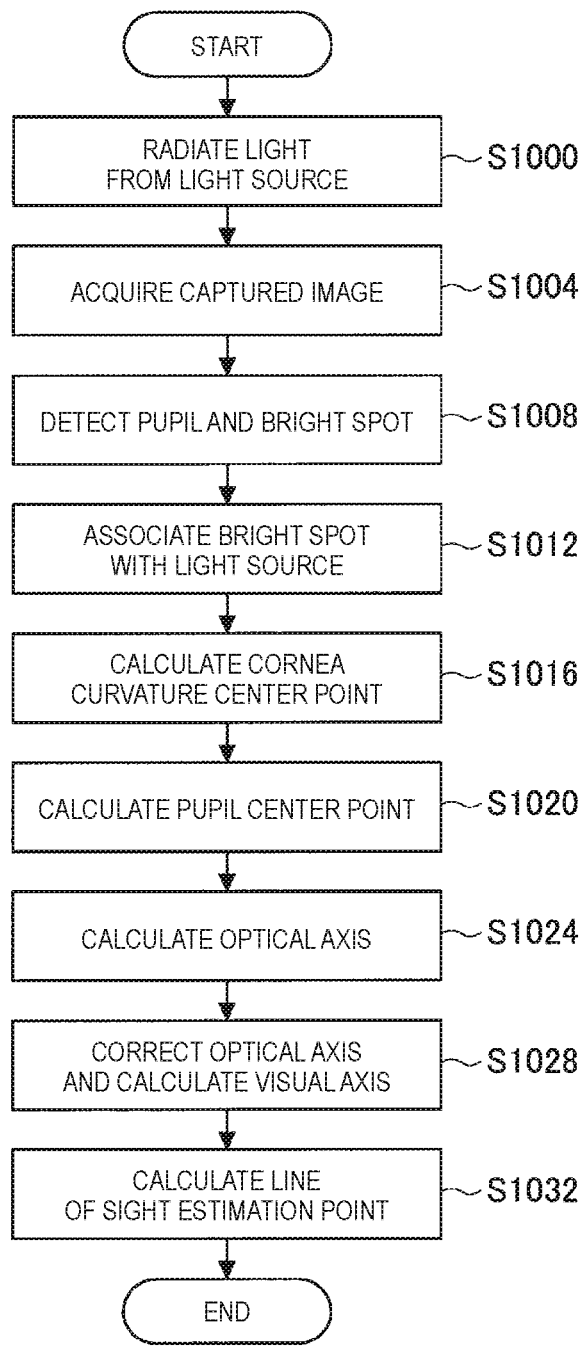
FIG. 5 is a flowchart illustrating an operation of the head mounted display according to an embodiment of the present disclosure.

The configuration of the head mounted display 100 has been described above. Subsequently, the operation of the head mounted display 100 will be described with reference to FIG. 5. FIG. 5 is a flowchart illustrating the operation of the head mounted display 100 according to an embodiment of the present disclosure.

First, the light source control unit 102 turns on and off the plurality of light sources 101 according to the blinking pattern of the light source 101 set in advance, and thus the eye is irradiated with the light from the light source 101 (step S1000). Therefore, the plurality of bright spots 15 are generated on the cornea.

Next, the imaging unit 103 images a state of the eye (step S1004). Therefore, the captured image information obtained by imaging the bright spot 15 generated on the cornea, the pupil 13, and the like is generated. The imaging unit 103 provides the captured image information to the image processing unit 104.

In addition, the image processing unit 104 analyzes the captured image information provided from the imaging unit 103 and detects the bright spot 15 and the pupil 13 (step S1008). A machine learning technique may be used in detecting the bright spot 15. Specifically, a machine learning program constructed in advance reads and learns about tens to tens of thousands of captured images obtained by imaging the bright spot. The image processing unit 104 may detect the bright spot 15 included in the captured image using the program.

In addition, a publicly known image recognition technique other than the machine learning is also able to be used in the detection processing of the bright spot 15. For example, the image processing unit 104 may perform a series of processes such as various kinds of image processing on the captured image, processing of acquiring a luminance distribution in the captured image, and processing of detecting a pixel having a relatively large difference in a luminance value with a surrounding pixel on the basis of the luminance distribution. In addition, the image processing unit 104 provides the generated bright spot related information to the light source control unit 102, the collation unit 105, and the line of sight estimation unit 106.

On the other hand, similarly to the detection processing of the bright spot 15, even in the detection processing of the pupil 13, the machine learning technique may be used and a publicly known image recognition technique other than the machine learning may be used. For example, the image processing unit 104 may perform a series of processes such as various kinds of image processing (adjustment processing of distortion, a black level, a white balance, or the like) on the captured image, processing of acquiring a luminance distribution in the captured image, processing of acquiring an outline (an edge) of the pupil 13 on the basis of the luminance distribution, and processing of approximating the detected outline of the pupil 13 with a figure such as a circle or an ellipse. In addition, the image processing unit 104 provides the generated pupil related information to the light source control unit 102 and the line of sight estimation unit 106.

Next, the collation unit 105 associates the bright spot 15 and the light source 101 with each other (step S1012). Specifically, the collation unit 105 acquires the bright spot related information from the image processing unit 104 and acquires the blinking pattern of the light source 101 from the light source control unit 102. The bright spot related information includes information related to the position where the bright spot 15 is generated and the frame when the bright spot 15 is generated, and the blinking pattern includes information related to the state (the on state or the off state) of the light source 101 in each frame. The collation unit 105 associates the bright spot 15 and the light source 101 with each other on a basis of a physical position relationship between the bright spot 15 and the light source 101. For example, a bright spot 15 closest to a certain light source 101 among the bright spots 15 generated on the cornea is set as the bright spot 15 corresponding to the light source 101. Here, the association method described above is an example, and the association between the bright spot 15 and the light source 101 may be performed by another method. For example, the collation unit 105 may associate the bright spot 15 and the light source 101 with each other using a machine learning program that has learned a correspondence relationship between the light source 101 and the bright spot 15 in advance.

Next, the line of sight estimation unit 106 calculates three-dimensional coordinates of the cornea curvature center point 17 (in a case in which the cornea is regarded as a part of a sphere, a center of the sphere) on the basis of the bright spot related information provided from the image processing unit 104 and the bright spot light source correspondence information provided from the collation unit 105 (step S1016). Specifically, the line of sight estimation unit 106 calculates the three-dimensional coordinates of the cornea curvature center point 17 of the cornea by solving a geometric calculation formula on a basis of a three-dimensional positional relationship of the imaging unit 103, the light source 101, and the bright spot 15 corresponding to the light source 101.

Next, the line of sight estimation unit 106 calculates three-dimensional coordinates of the pupil center point 16 on the basis of the pupil related information provided from the image processing unit 104 (step S1020). Specifically, the line of sight estimation unit 106 calculates three-dimensional coordinates of a plurality of points on the outline of the pupil 13 in the captured image by using parameters of a positional relationship between the imaging unit 103 and the eyeball 10, a refractive index of light on a cornea surface, a distance between the cornea curvature center point 17 of the cornea and the pupil center point 16, and the like, and obtains center points of such coordinates to calculate the three-dimensional coordinates of the pupil center point 16.

Next, the line of sight estimation unit 106 obtains the optical axis (the direction in which the eyeball 10 is facing), by calculating the vector directed from the three-dimensional coordinates of the cornea curvature center point 17 calculated in step S1016 to the three-dimensional coordinates of the pupil center point 16 calculated in step S1020 (step S1024).

Here, in humans, the optical axis does not always coincide with a direction in which the line of sight is actually directed by a human (hereinafter, referred to as a visual axis). This is caused by a shape and a size of the eyeball 10, a disposition of a retina or an optic nerve in the eyeball 10, and the like, and has individual differences. As described above, there is an error peculiar to the user between the optical axis and the visual axis.

In consideration of such circumstances, in an embodiment of the present disclosure, the line of sight estimation unit 106 performs processing of correcting the optical axis to the visual axis 18 (step S1028). For example, information related to a correlation between a gaze point and the optical axis when the line of sight is directed to the gaze point is acquired in advance by presenting the gaze point to the user, and the line of sight estimation unit 106 is able to acquire the visual axis 18 by correcting the optical axis on the basis of the corresponding information. However, since this correction method is an example, the line of sight estimation unit 106 is able to adopt an arbitrary correction method.

Next, the line of sight estimation unit 106 calculates the line of sight estimation point 19 of the user on the basis of the visual axis 18 (step S1032). Specifically, the line of sight estimation unit 106 calculates the coordinates of the point where the visual axis 18 and the display unit 107 intersect with each other, by acquiring the positional relationship between the display unit 107 and the eyeball 10 in advance. The corresponding point is the line of sight estimation point 19 estimated as the gaze point of the user.

The line of sight estimation of the user is performed using the head mounted display 100 according to an embodiment of the present disclosure, by performing the processing described above.

3. Light Source Control Based on Imaging Processing Information

[3.1. Overview of Light Source Control Based on Imaging Processing Information]

The operation of the head mounted display 100 according to an embodiment of the present disclosure has been described above. Subsequently, the overview of the light source control based on the imaging processing information will be described.

As described above, the association between the light source 101 and the bright spot 15 is performed when the line of sight estimation is performed. Here, in a case in which the state of the light source 101 is changed when the exposure is performed, a desired bright spot 15 may not be imaged and the light source 101 and the bright spot 15 may not be associated with each other in some cases.

For example, in a case in which the state of the light source 101 is changed from the off state to the on state, when the lighting processing of the light source 101 is performed during the exposure, the light source 101 and the bright spot 15 may not be associated with each other due to an insufficient luminance of the imaged bright spot 15 in some cases.

In addition, in a case in which the state of the light source 101 is changed from the on state to the off state, when the lights-out processing of the light source 101 is performed during the exposure, the bright spot 15 due to the light irradiated from the light source 101 appears on the captured image in some cases. Therefore, the association between the light source 101 and the bright spot 15 may not be performed or incorrect association may be performed in some cases. A method described below is a method for solving the above problem.

Figure 6:
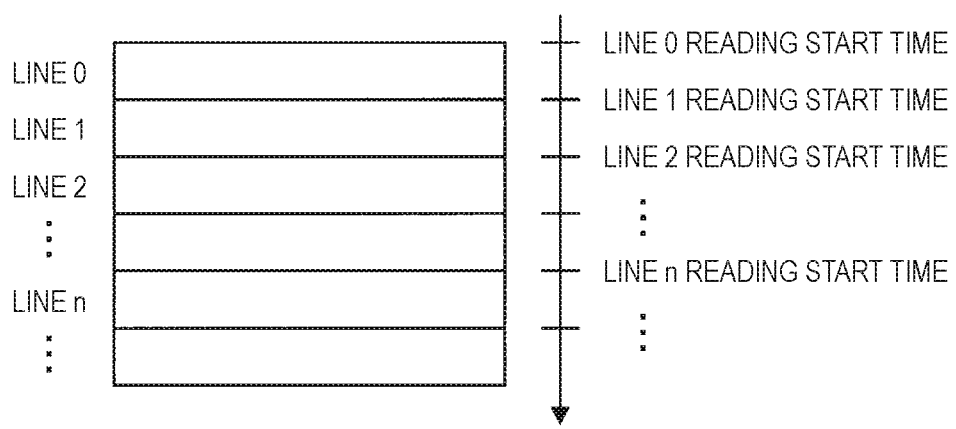
FIG. 6 is a schematic diagram of a captured image captured by a rolling shutter method.

Next, an overview of the rolling shutter method used in an embodiment of the present disclosure will be described with reference to FIG. 6. FIG. 6 is a schematic diagram of the captured image captured by the rolling shutter method.

As shown in FIG. 6, the rolling shutter method is a method in which the captured image is divided into a plurality of lines (rows) and the exposure and reading of the captured image are performed for each line. In general, in the rolling shutter method, the exposure and reading are sequentially performed from the line positioned at an upper portion in the captured image. Therefore, a line 0 in FIG. 6 is a line on which the exposure and reading are performed earliest among all lines.

In an embodiment of the present disclosure, the case in which the rolling shutter method is used has been described, but a global shutter method may be used. The global shutter method is a method in which the captured image is not divided into a plurality of lines, the exposure is performed on the entire captured image at the same time, and reading is performed on the entire captured image at the same time.

Figure 7:
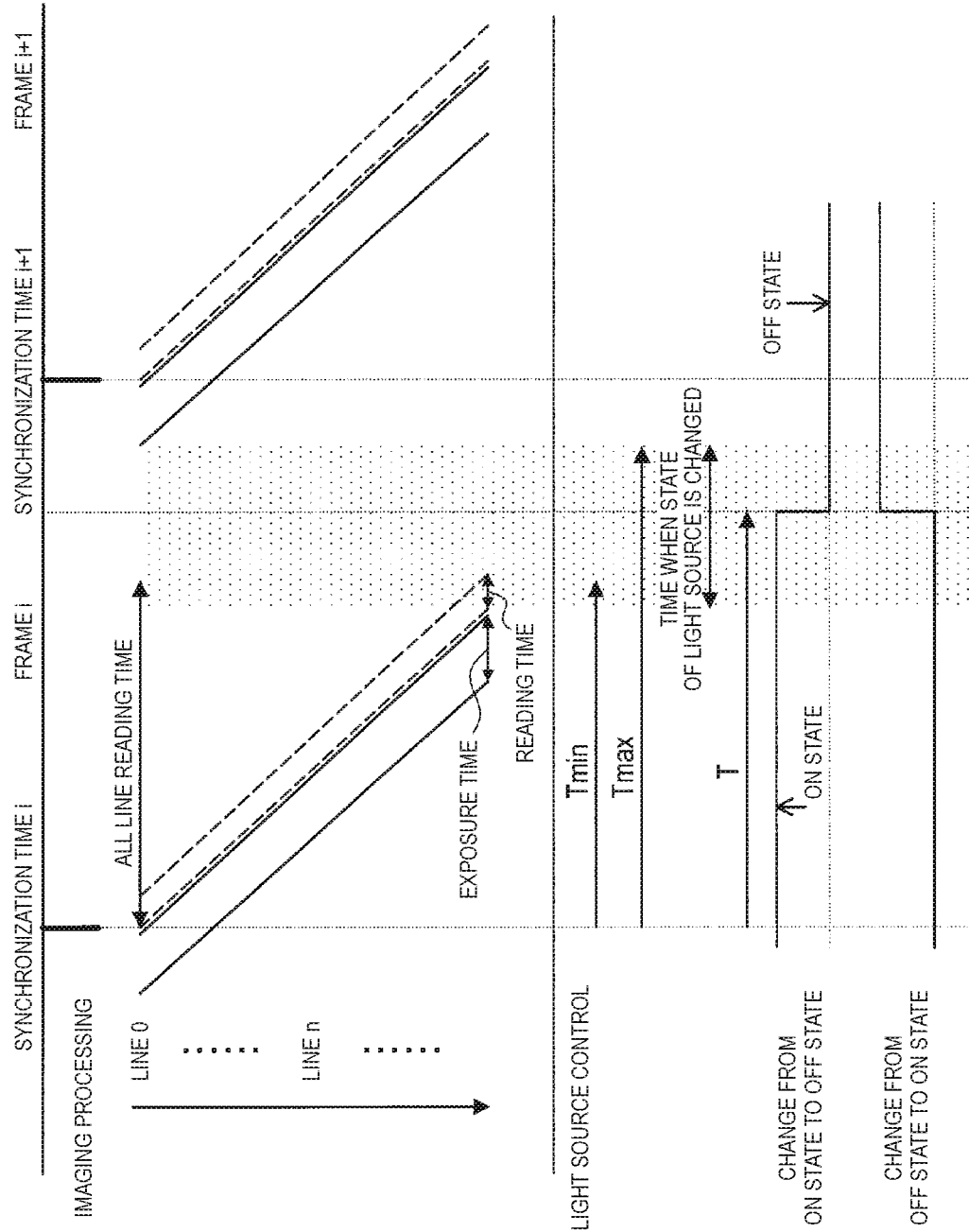
FIG. 7 is a diagram illustrating an overview of light source control based on imaging processing information.

The overview of the rolling shutter method has been described above. Subsequently, an overview of the light source control based on the imaging processing information will be described with reference to FIG. 7. FIG. 7 is a diagram illustrating the overview of the light source control based on the imaging processing information.

FIG. 7 shows a state in which a plurality of frames (a frame i and a frame i+1) successive in chronological order. The number of the frames is arbitrary. In addition, as described above, the light source control unit 102 is able to control the light source 101 while synchronizing with the imaging processing by the imaging unit 103, by the synchronization signal generated by the imaging unit 103. In FIG. 7, the synchronization is performed at a timing at which reading of the captured image is started, but the timing at which the synchronization is performed is arbitrary. It is assumed that an interval of the synchronization is regular.

In addition, it is shown that the exposure and reading of the captured image are performed sequentially from the line 0 of the captured image by the imaging processing of the rolling shutter method. Here, the light source control unit 102 calculates an exposure end time of each frame as the earliest time Tmin for changing the state of the light source 101, on the basis of the imaging processing information provided from the exposure control unit 110. In addition, the light source control unit 102 calculates an exposure start time of each frame as the lasted time Tmax for changing the state of the light source 101, on the basis of the imaging processing information provided from the exposure control unit 110. Then, the light source control unit 102 changes the state of the light source 101 at a time T included in a time from the Tmin to the Tmax. A method of calculating the Tmin and Tmax will be described later.

According to the method described above, the light source control unit 102 is able to change the state of the light source 101 at the time when the exposure is not performed. Therefore, since it is possible to generate the desired bright spot 15, it is possible to improve the accuracy of the association between the bright spot 15 and the light source 101.

[3.2. Light Source Control Flow Based on Imaging Processing Information]

Figure 8:
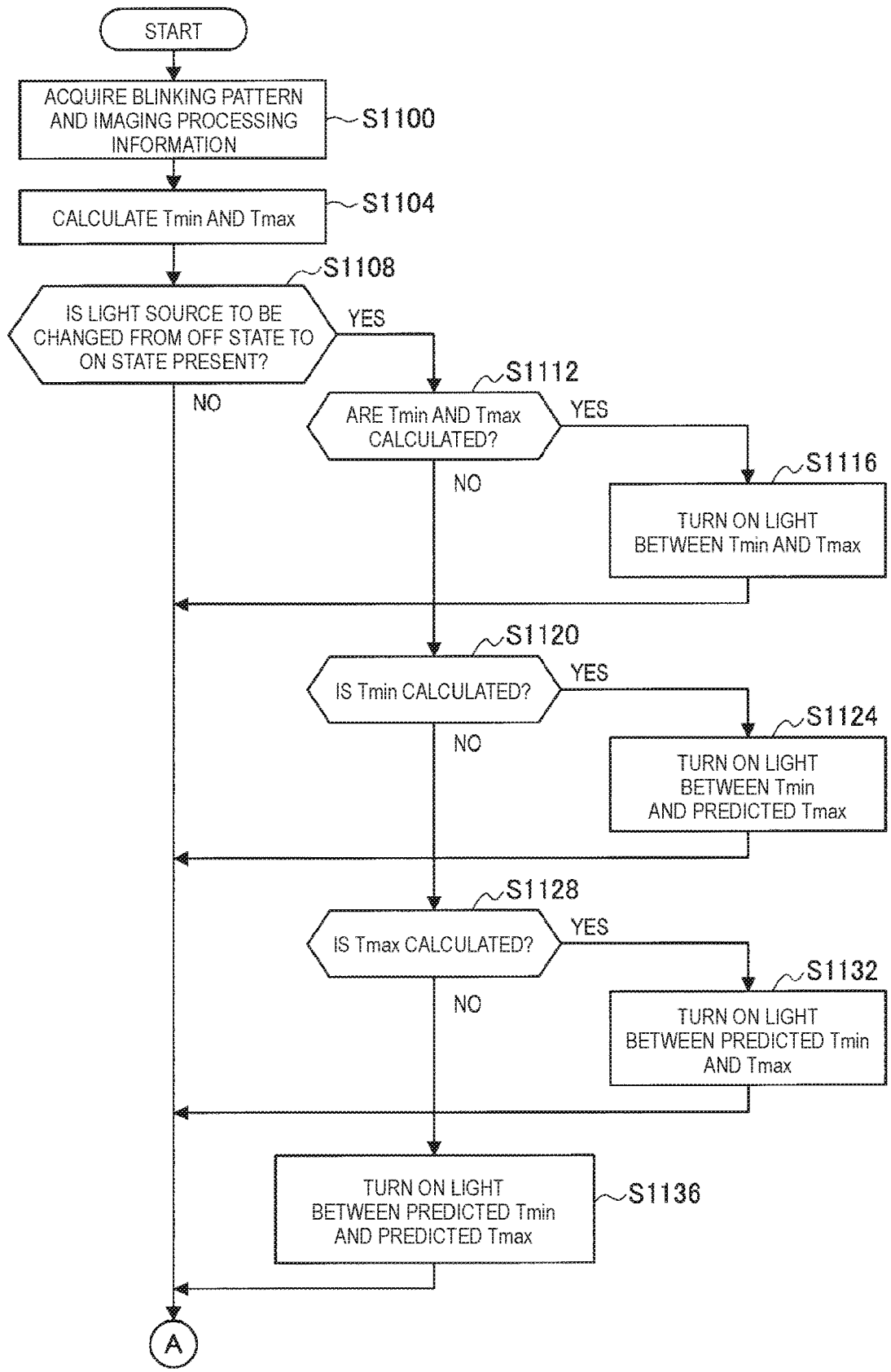
FIG. 8 is a flowchart illustrating an operation of changing a state of the light source from an off state to an on state on the basis of the imaging processing information.
Figure 9:
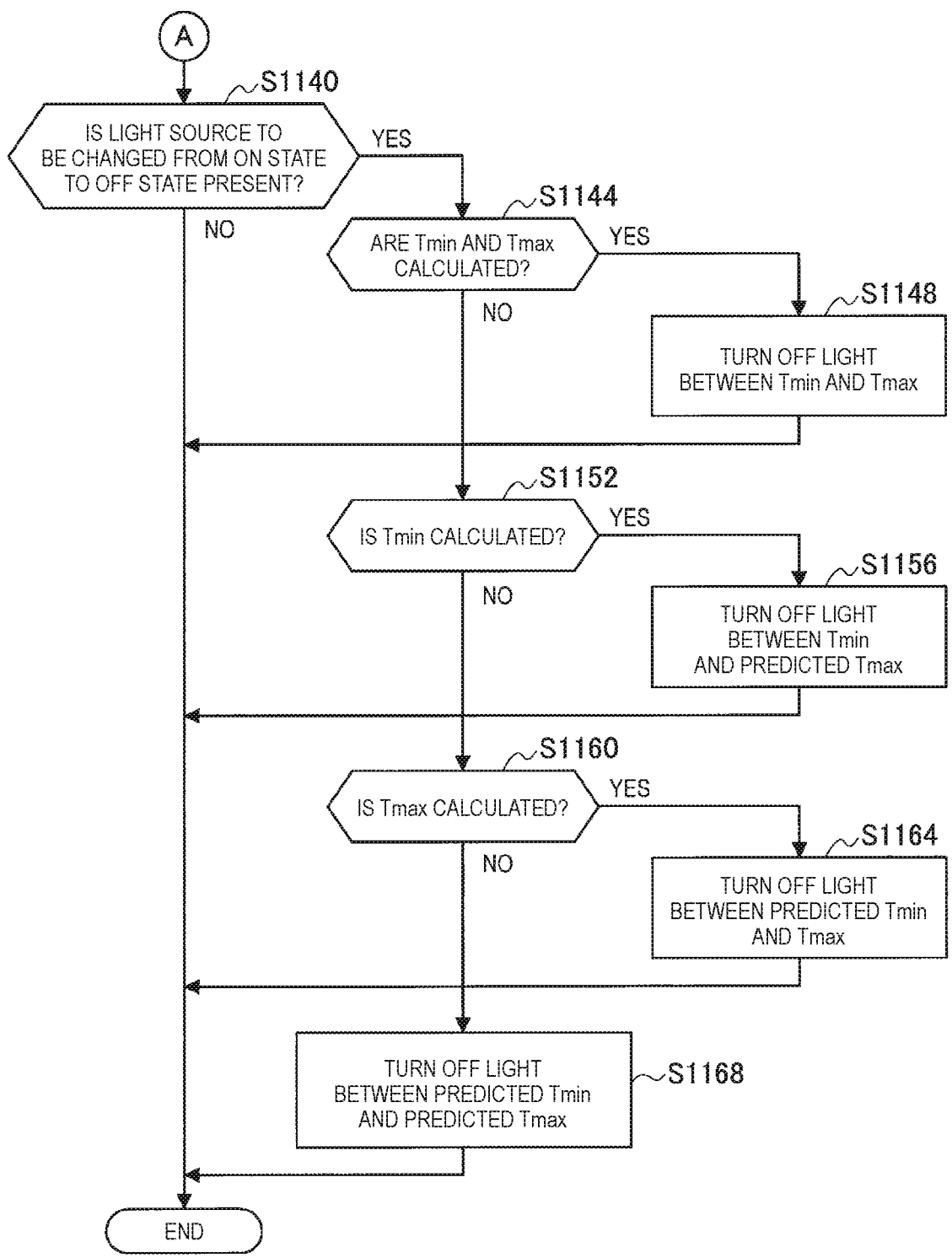
FIG. 9 is a flowchart illustrating an operation of changing the state of the light source from the on state to the off state on the basis of the imaging processing information.

The overview of the light source control based on the imaging processing information has been described above. Subsequently, the control flow of the light source 101 based on the imaging processing information will be described with reference to FIGS. 8 and 9. FIG. 8 is a flowchart illustrating an operation of changing the state of the light source 101 from the off state to the on state on the basis of the imaging processing information, and FIG. 9 is a flowchart illustrating an operation of changing the state of the light source 101 from the on state to the off state on the basis of the imaging processing information. The processing shown in FIGS. 8 and 9 is included in the processing (step S1000) in which the light is irradiated from the light source 101 in FIG. 5. Hereinafter, a frame under imaging processing is referred to as a current frame, and a frame next to the current frame is referred to as a next frame.

First, the light source control unit 102 acquires the blinking pattern and the imaging processing information from the exposure control unit 110 (step S1100). Next, the light source control unit 102 calculates the above-described Tmin and Tmax on the basis of the imaging processing information (step S1104). Specifically, the light source control unit 102 calculates the Tmin on a basis of an exposure time of the current frame included in the imaging processing information provided from the exposure control unit 110 and a relative relationship between a time when the synchronization signal is acquired and the start time (or the end time) of the exposure. In addition, the light source control unit 102 calculates the Tmax on a basis of an exposure time of the next frame included in the imaging processing information provided from the exposure control unit 110 and the relative relationship between the time when the synchronization signal is acquired and the start time (or the end time) of the exposure.

In addition, in a case in which the light source 101 that is changed from the off state to the on state in the next frame is present (step S1108/Yes), the light source control unit 102 changes the state of the light source 101 from the off state to the on state. Specifically, in step S1104, in a case in which both of the Tmin and the Tmax are calculated (step S1112/Yes), the light source control unit 102 changes the state of the light source 101 from the off state to the on state at the time between the Tmin and the Tmax (step S1116).

In step S1104, in a case in which the Tmin is calculated and the Tmax is not calculated (step S1120/Yes), the light source control unit 102 predicts the Tmax. Specifically, the light source control unit 102 predicts the Tmax that is the exposure start time of the next frame by inputting the exposure time of the current frame to light source control setting information indicating a relationship between the exposure time created in advance and the control timing of the light source 101. In addition, the light source control unit 102 changes the state of the light source 101 from the off state to the on state at a time between the Tmin and the predicted Tmax (step S1124).

In step S1104, in a case in which the Tmax is calculated and the Tmin is not calculated (step S1128/Yes), the light source control unit 102 predicts the Tmin. Specifically, the light source control unit 102 predicts the Tmin that is the exposure end time of the current frame by inputting the exposure time of the next frame to the above-described light source control setting information created in advance. In addition, the light source control unit 102 changes the state of the light source 101 from the off state to the on state at a time between the predicted Tmin and the Tmax (step S1132).

In step S1104, in a case in which both of the Tmin and the Tmax are not calculated (step S1128/No), the light source control unit 102 predicts the Tmin and the Tmax. Specifically, the light source control unit 102 predicts the Tmin that is the exposure end time of the current frame and the Tmax that is the exposure start time of the next frame by inputting the exposure time of any frame that is able to be acquired to the above-described light source control setting information created in advance. In addition, the light source control unit 102 changes the state of the light source 101 from the off state to the on state at a time between the predicted Tmin and the predicted Tmax (step S1136).

Subsequently, in a case in which the light source 101 that is changed from the on state to the off state in the next frame is present (step S1140/Yes), the light source control unit 102 changes the state of the light source 101 from the on state to the off state. Specifically, in step S1104, in the case in which both of the Tmin and the Tmax are calculated (step S1144/Yes), the light source control unit 102 changes the state of the light source 101 from the on state to the off state at the time between the Tmin and the Tmax (step S1148).

In step S1104, in the case in which the Tmin is calculated and the Tmax is not calculated (step S1152/Yes), the light source control unit 102 predicts the Tmax on the basis of the above-described light source control setting information created in advance. The prediction method is as described above. In addition, the light source control unit 102 changes the state of the light source 101 from the on state to the off state at the time between the Tmin and the predicted Tmax (step S1156).

In step S1104, in the case in which the Tmax is calculated and the Tmin is not calculated (step S1160/Yes), the light source control unit 102 predicts the Tmin on the basis of the above-described light source control setting information created in advance. The prediction method is as described above. In addition, the light source control unit 102 changes the state of the light source 101 from the on state to the off state at the time between the predicted Tmin and the Tmax (step S1164).

In step S1104, in the case in which both of the Tmin and the Tmax are not calculated (step S1160/No), the light source control unit 102 predicts the Tmin and the Tmax on the basis of the above-described light source control setting information created in advance. The prediction method is as described above. In addition, the light source control unit 102 changes the state of the light source 101 from the on state to the off state at the time between the predicted Tmin and the predicted Tmax (step S1168).

In addition, the flowchart described above may be suitably changed. For example, each processing may also be processed in an order different from the order described in the flowchart or may be processed in parallel as appropriate. Of course, the processing of changing the state of the light source 101 from the off state to the on state (step S1140 to step S1168) may be processed before the processing of changing the state of the light source 101 from the on state to the off state (step S1108 to step S1136) or may be processed in parallel with the processing of changing the state of the light source 101 from the on state to the off state (step S1108 to step S1136).

[3.3. First Modification Example]

Figure 10:
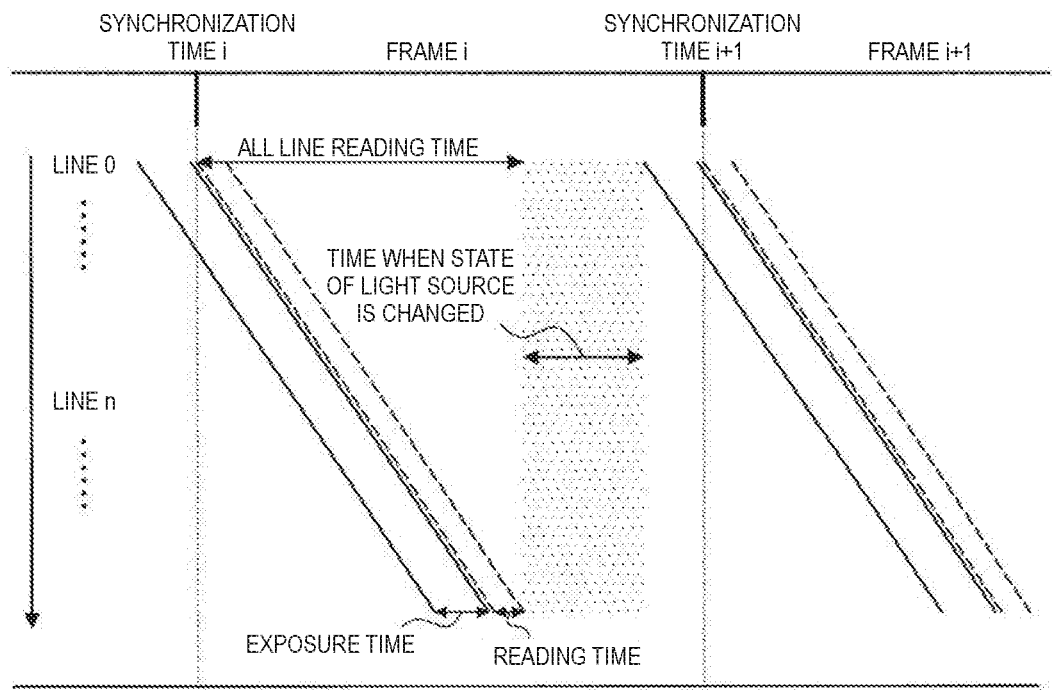
FIG. 10 is a diagram illustrating an overview of light source control of a first modification example.

The operation of changing the state of the light source 101 on the basis of the exposure time of each frame included in the imaging processing information provided from the exposure control unit 110 has been described above. Subsequently, in the following description, a modification example of a method of changing the state of the light source 101 will be described with reference to FIG. 10. FIG. 10 is a diagram illustrating the overview of the light source control of the first modification example.

In the first modification example, the light source control unit 102 changes the state of the light source 101 after a reading completion notification of the captured image included in the imaging processing information provided from the imaging unit 103. Specifically, the imaging unit 103 provides the reading completion notification to the light source control unit 102 at a timing at which reading processing of all lines of the captured image is completed. Then, the light source control unit 102 changes the state of the light source 101 at a time between the timing at which the corresponding notification is provided and the Tmax calculated by the method described above. Therefore, as shown in FIG. 10, a timing at which reading of the last line of the captured image captured by the rolling shutter method is completed is the Tmin In addition, in the first modification example, the information included in the imaging processing information provided from the imaging unit 103 is not limited to the reading completion notification of the captured image. For example, the imaging processing information may include an exposure completion notification. Specifically, the imaging unit 103 provides the exposure completion notification to the light source control unit 102 at a timing at which the exposure processing of all lines of the captured image is completed. Then, the light source control unit 102 changes the state of the light source 101 at a time between the timing at which the corresponding notification is provided and the Tmax calculated by the method described above. As shown in FIG. 7, a timing at which the exposure of the last line of the captured image captured by the rolling shutter method is completed is the Tmin.

In addition, in the first modification example, the Tmax may not be calculated. Specifically, the light source control unit 102 may change the state of the light source 101 immediately after acquiring the reading completion notification or the exposure completion notification of the captured image or after a predetermined time has elapsed.

As described above, the state of the light source 101 is changed after the reading completion notification or the exposure completion notification included in the imaging processing information provided from the imaging unit 103. Therefore, since it is not necessary for the light source control unit 102 to calculate the Tmin or the Tmax, it is possible to reduce a load of processing of the light source control unit 102.

[3.4. Second Modification Example]

The first modification example according to an embodiment of the present disclosure has been described above. In the following description, the second modification example according to an embodiment of the present disclosure will be described. The second modification example is a method in which in a case in which imaging processing is performed by the rolling shutter method, a position in the captured image in which the bright spot 15 is generated is predicted, and the state of the light source 101 is changed at a time when the exposure is not performed on a line corresponding to the position.

Figure 11:
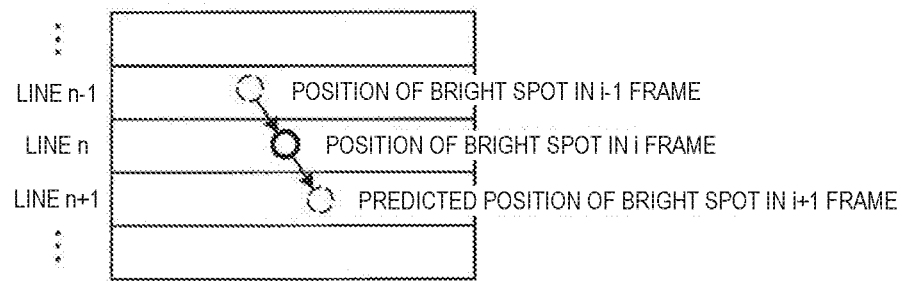
FIG. 11 is a schematic diagram illustrating an example of a method of predicting a position where a bright spot is imaged.

Here, a specific example of a method of predicting the position where the bright spot 15 is generated will be described with reference to FIG. 11. FIG. 11 is a schematic diagram illustrating an example of a method of predicting a position where the bright spot 15 is imaged. FIG. 11 illustrates the position where the bright spot 15 is generated in each frame.

The bright spot 15 is generated at a line n−1 in an i−1 frame and is generated at a line n in the i frame. The imaging unit 103 images the bright spots 15. The image processing unit 104 analyzes the captured image information generated by the imaging unit 103 and predicts the position of the bright spot 15 in the i+1 frame.

For example, the image processing unit 104 predicts the position of the bright spot 15 in the i+1 frame on a basis of a current frame rate, three-dimensional position attitude information of the imaging unit 103 up to the i frame, three-dimensional position information of the bright spot 15 up to the i frame, or position information (or line information) in the captured image of the bright spot 15 up to the i frame. Of course, the i−1 frame, the i frame, and the i+1 frame are examples, and the position of the bright spot 15 in a next frame or a frame captured after the next frame may be predicted on the basis of the position of the bright spot 15 in the current frame or in a frame captured in the past from the current frame.

Information related to a correspondence relationship between the information (the frame rate, the three-dimensional position attitude information of the imaging unit 103 up to the frame during the imaging processing, the three-dimensional position information of the bright spot 15 up to the frame during the imaging processing, or the position information in the captured image of the bright spot 15 up to the frame during the imaging processing) used in the prediction descried above and the line where the generation of the bright spot 15 is predicted may be created in advance and the information may be used. The image processing unit 104 acquires the line where the generation of the bright spot 15 is predicted by inputting the information used in the prediction descried above to the information related to the correspondence relationship of the line where the generation of the bright spot 15 is predicted. Therefore, it is possible to reduce a load of the prediction processing of the image processing unit 104.

As described above, the exposure control unit 110 calculates the exposure time for the line corresponding to the position where the generation of the bright spot 15 is predicted by predicting the position. In addition, the light source control unit 102 changes the state of the light source 101 at the time when the corresponding line is not exposed.

Specifically, in the processing of checking a present or absence of the light source 101 to be changed to the on state (step S1108) in FIG. 8, the light source control unit 102 predicts a line where the bright spot 15 corresponding to the light source 101 to be changed to the on state is generated. In addition, the light source control unit 102 calculates the Tmin and the Tmax of the line on the basis of the exposure time of each frame included in the imaging processing information provided from the exposure control unit 110, and changes the state of the light source 101 at a time between the calculated Tmin and Tmax. The subsequent processing is the same as the above description in FIG. 8 and thus the subsequent processing will be omitted.

In addition, in the processing of checking a present or absence of the light source 101 to be changed to the off state (step S1140) in FIG. 9, the light source control unit 102 predicts a line where the bright spot 15 corresponding to the light source 101 to be changed to the off state is generated. In addition, the light source control unit 102 calculates the Tmin and the Tmax of the line on the basis of the exposure time of each frame included in the imaging processing information provided from the exposure control unit 110, and changes the state of the light source 101 at the time between the calculated Tmin and Tmax. The subsequent processing is the same as the above description in FIG. 9 and thus the subsequent processing will be omitted.

Since the light source control unit 102 is able to change the state of the light source 101 at the time when the exposure is not performed on each line according to the method described above, as shown in FIG. 12, the time for changing the state of the light source 101 is a time from the end of the exposure time of the current frame to the start of the exposure time of the next frame in each line. That is, according to the method described above, it is possible to increase the time for changing the state of the light source 101 than in the case in which the generation position of the bright spot 15 is not predicted (FIGS. 7 and 10).

In addition, the prediction of the position of the bright spot 15 may be performed on the basis of the positional relationship between the light source 101 and the eyeball 10. For example, in a case in which the light source 101 positioned over the eyeball 10 irradiates the eyeball 10 with the light, a possibility that the bright spot 15 will be generated in an upper hemisphere of the eyeball 10 is statistically high and a possibility that the bright spot 15 will be generated in a lower hemisphere of the eyeball 10 is statistically low. In this case, the state of the light source 101 is changed at the time when the exposure is not performed on the line on which the upper hemisphere of the eyeball 10 is imaged.

As described above, an approximate position of the bright spot 15 is predicted on the basis of the positional relationship between the light source 101 and the eyeball 10. Therefore, it is possible to reduce the processing load than predicting the position of the bright spot 15 by analyzing the captured image information described above.

Figure 13:
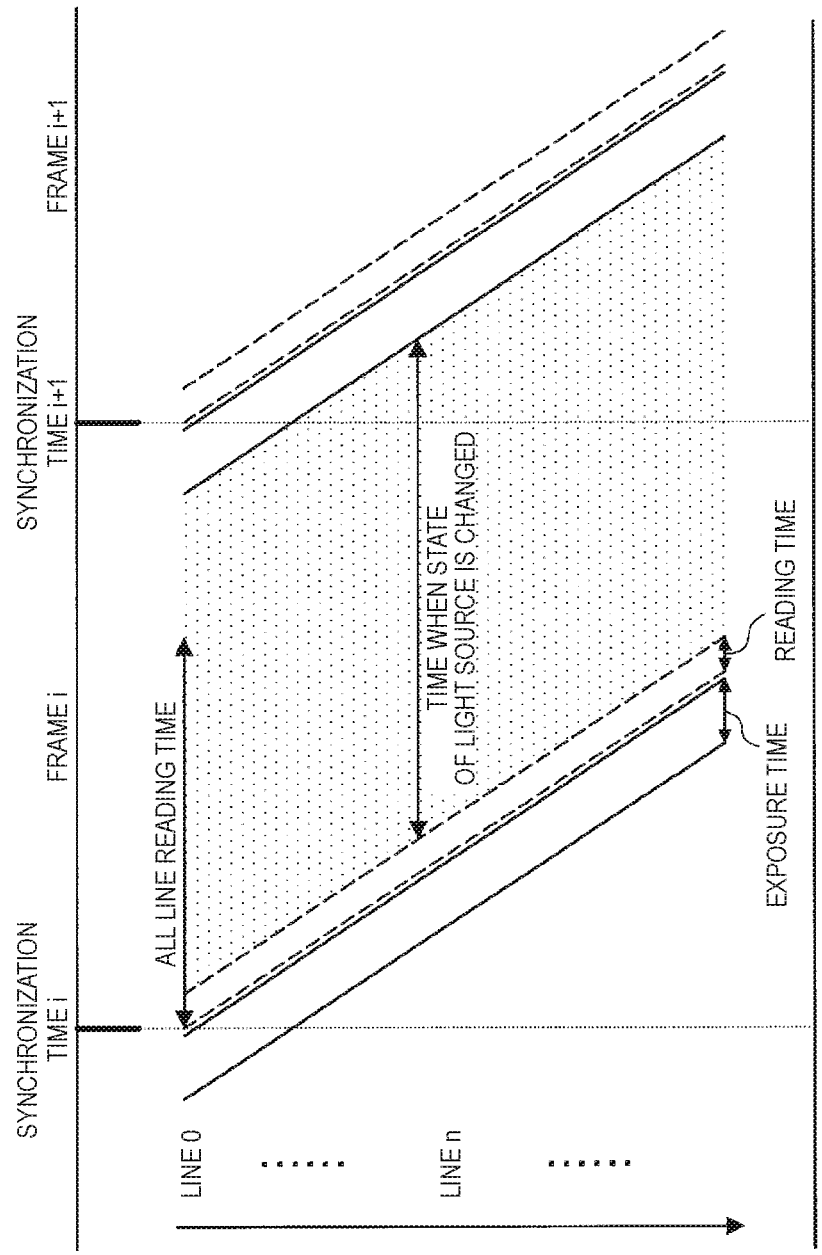
FIG. 13 is a schematic diagram illustrating the light source control of the second modification example.

In addition, also in the second modification example, as in the first modification example, the light source control unit 102 may change the state of the light source 101 after the reading completion notification or the exposure completion notification included in the imaging processing information provided from the imaging unit 103. Specifically, the imaging unit 103 provides the reading completion notification to the light source control unit 102 every time the reading processing of each line of the captured image is completed. The light source control unit 102 may change the state of the light source 101 at a time between the timing at which the corresponding notification is provided to the Tmax calculated on the basis of the exposure time of each frame included in the imaging processing information provided from the exposure control unit 110. In this case, as shown in FIG. 13, the timing at which the reading of each line is completed is the Tmin of each line.

Figure 12:
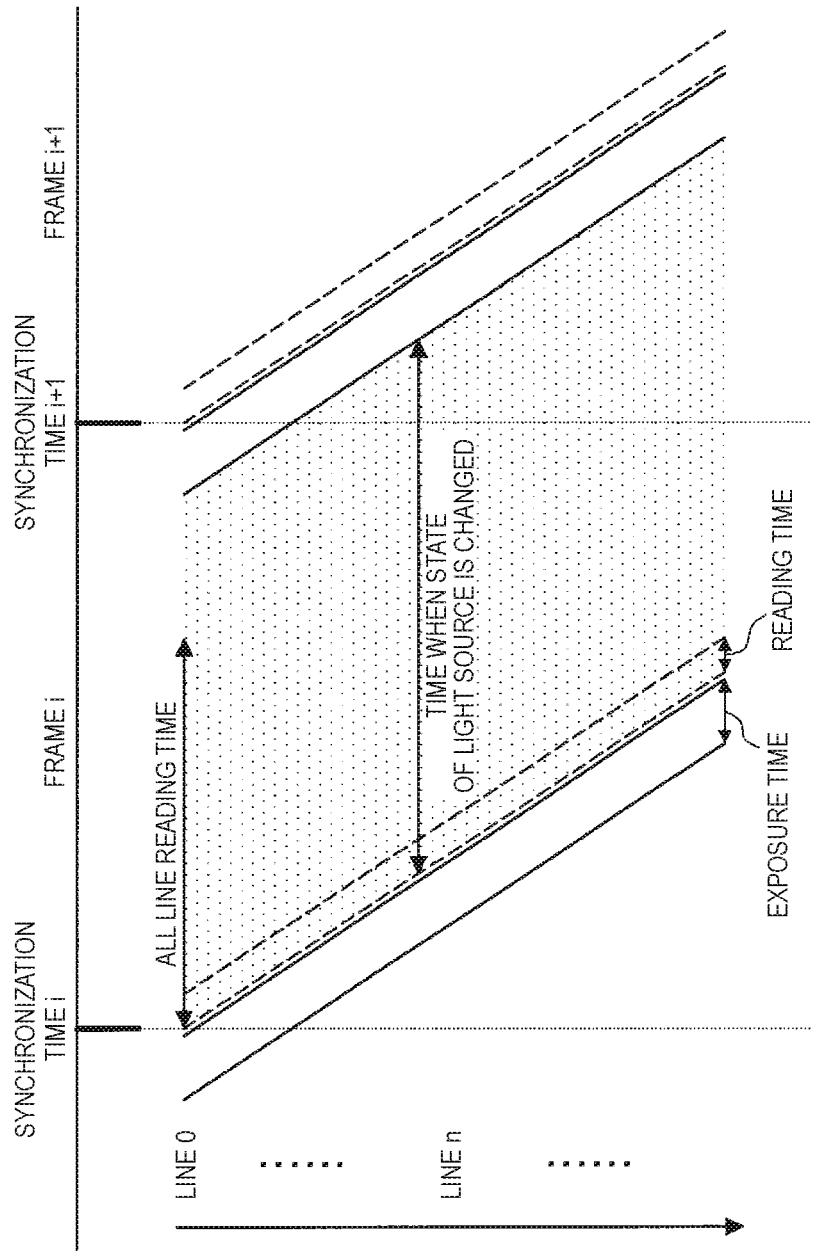
FIG. 12 is a schematic diagram illustrating the light source control of a second modification example.

In addition, the imaging unit 103 provides the exposure completion notification to the light source control unit 102 every time the exposure processing of each line of the captured image is completed. The light source control unit 102 may change the state of the light source 101 at a time between the timing at which the corresponding notification is provided to the Tmax calculated on the basis of the exposure time of each frame included in the imaging processing information provided from the exposure control unit 110. In this case, as shown in FIG. 12, the timing at which the exposure of each line is completed is the Tmin of each line.

Figure 14:
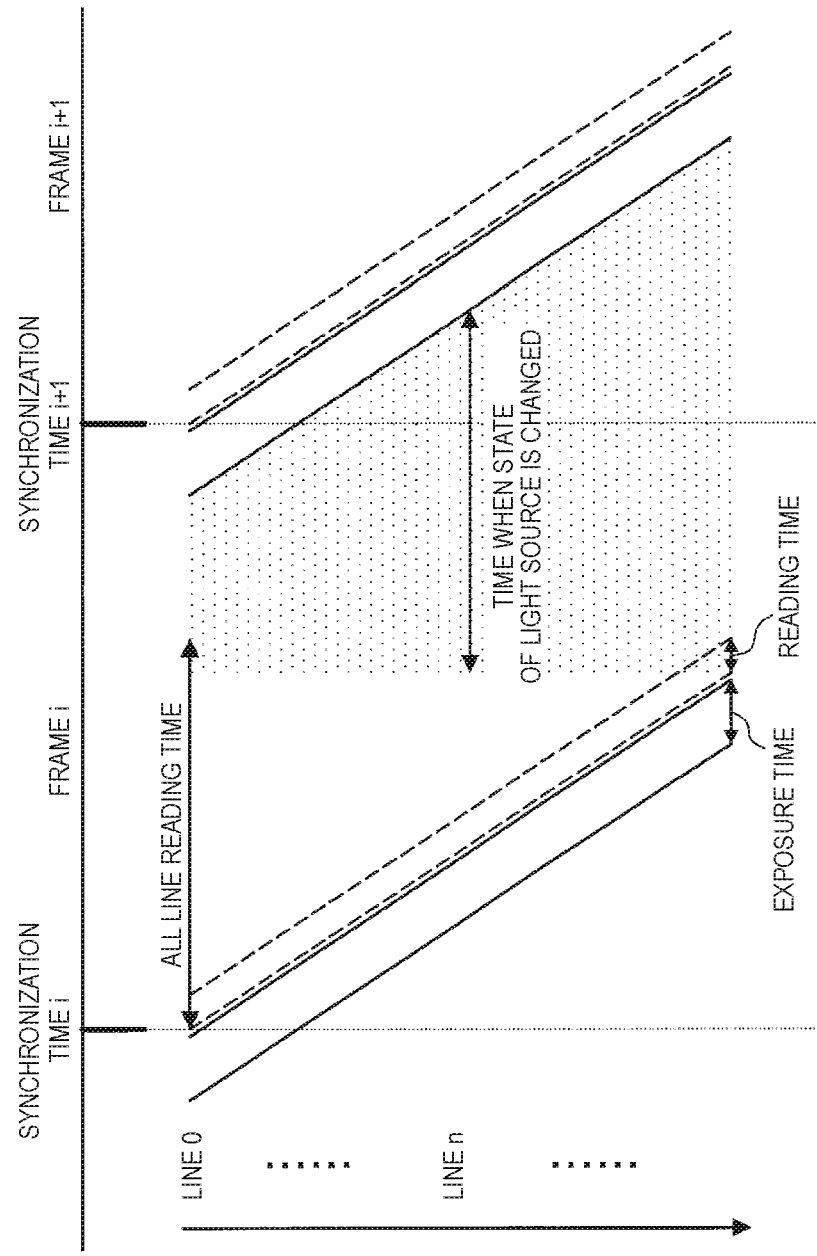
FIG. 14 is a schematic diagram illustrating the light source control of the second modification example.

In addition, the reading completion notification or the exposure completion notification may be temporarily provided according to the performance or specification of the device. For example, as shown in FIG. 14, the imaging unit 103 may provide the exposure completion notification to the light source control unit 102 at the timing at which the exposure processing of all lines of the captured image is completed. In this case, as shown in FIG. 14, the timing at which the exposure of the last line of the captured image captured by the rolling shutter method is completed is the Tmin.

Figure 15:
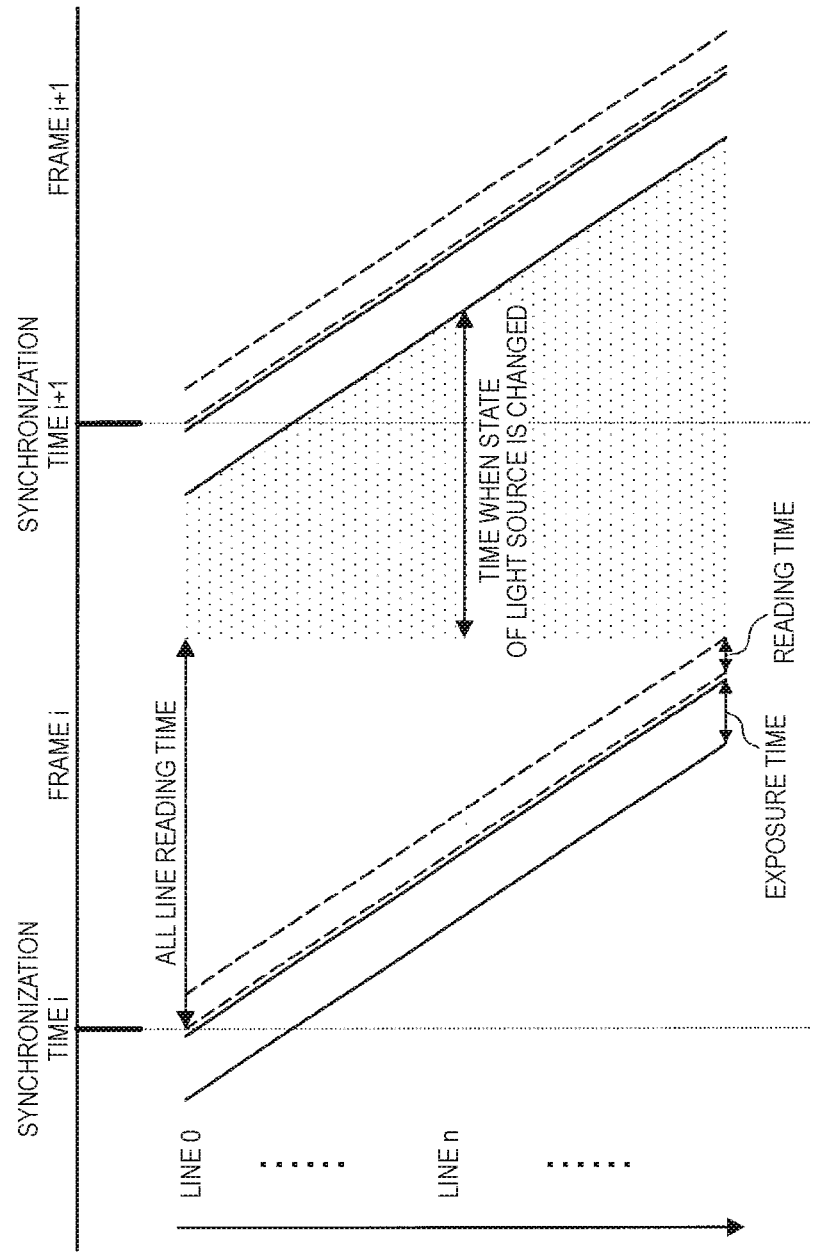
FIG. 15 is a schematic diagram illustrating the light source control of the second modification example.

In addition, as shown in FIG. 15, the imaging unit 103 may provide the reading completion notification to the light source control unit 102 at the timing at which the reading processing of all lines of the captured image is completed. In this case, as shown in FIG. 15, the timing at which the reading of the last line of the captured image captured by the rolling shutter method is completed is the Tmin.

In addition, similarly to the first modification example, the Tmax may not be calculated. Specifically, the light source control unit 102 may change the state of the light source 101 immediately after acquiring the reading completion notification or the exposure completion notification of the captured image or after a predetermined time has elapsed.

As described above, the state of the light source 101 is changed after the reading completion notification or the exposure completion notification included in the imaging processing information provided from the exposure control unit 110. Therefore, since it is not necessary for the light source control unit 102 to calculate the Tmin or the Tmax, it is possible to reduce a load of processing of the light source control unit 102.

4. Hardware Configuration of Head Mounted Display

Figure 16:
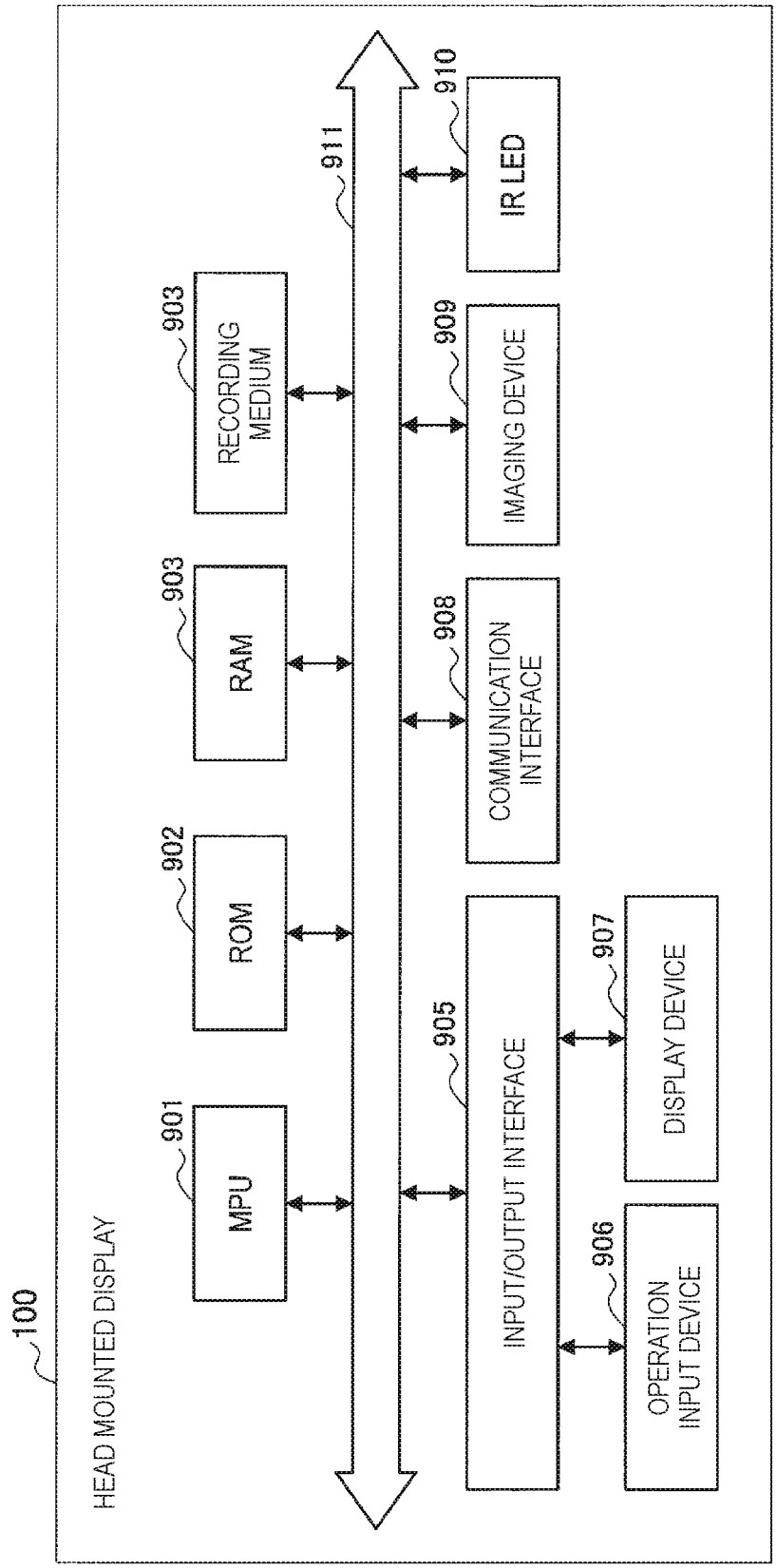
FIG. 16 is a block diagram illustrating a hardware configuration of the head mounted display according to an embodiment of the present disclosure.

FIG. 16 is a block diagram illustrating the hardware configuration of the head mounted display 100 according to an embodiment of the present disclosure. For example, the head mounted display 100 includes an MPU 901, a ROM 902, a RAM 903, a recording medium 904, an input/output interface 905, an operation input device 906, a display device 907, a communication interface 908, an imaging device 909, and an infrared spectroscopy light emitting diode (IR LED) 910. In addition, for example, the head mounted display 100 connects each configuration element with each other by a bus 911 as a data transmission path.

The MPU 901 includes one or more processors or various processing circuits, and has a function of controlling or processing each configuration element included in the head mounted display 100. In addition, for example, the MPU 901 functions as the light source control unit 102, the image processing unit 104, the collation unit 105, the line of sight estimation unit 106, the display control unit 108, and the exposure control unit 110 in the head mounted display 100.

The ROM 902 functions as the storage unit 109 and stores a program used by the MPU 901, control data such as an operation parameter, or the like. The RAM 903 functions as the storage unit 109 and temporarily stores, for example, a program to be executed by the MPU 901.

The recording medium 904 functions as the storage unit 109, and stores various pieces of data such as data related to information processing method according to the present embodiment such as information related to eyes, image data indicating the captured image, or an application.

An example of the recording medium 904 may include a magnetic recording medium such as a hard disk or a non-volatile memory such as a flash memory. In addition, the recording medium 904 may be detachable from the head mounted display 100.

The input/output interface 905 connects the operation input device 906 and the display device 907 with each other. The operation input device 906 functions as an operation unit (not shown). In addition, the display device 907 functions as the display unit 107. Here, an example of the input/output interface 905 may include a universal serial bus (USB) terminal, a digital visual interface (DVI) terminal, a high-definition multimedia interface (HDMI) (registered trademark) terminal, various processing circuits, or the like.

For example, the operation input device 906 is provided on the head mounted display 100, and is connected with the input/output interface 905 in the head mounted display 100. An example of the operation input device 906 may include a button, a direction key, a rotary selector such as a jog dial, a combination thereof, or the like.

For example, the display device 907 is provided on the head mounted display 100, and is connected with the input/output interface 905 in the head mounted display 100. An example of the display device 907 may include a liquid crystal display, an organic electro-luminescence display, an organic light emitting diode display (OLED), or the like.

In addition, it is needless to say that the input/output interface 905 is able to be connected to an external device such as an operation input device (for example, a keyboard, a mouse, or the like), a display device, or an imaging device as an external device of the head mounted display 100. In addition, for example, the display device 907 may be a device that is able to perform a display and a user operation such as a touch device.

The communication interface 908 is communication means included in the head mounted display 100. The communication interface 908 functions as a communication unit (not shown) for performing wireless or wired communication with an external device (or an external apparatus) such as an external imaging device, an external display device, an external device attached to a head of the user according to the present embodiment to be used through a network (or directly).

An example of the communication interface 908 includes a communication antenna and radio frequency (RF) circuit (wireless communication), an IEEE802.15.1 port and transmission and reception circuit (wireless communication), an IEEE802.11 port and transmission and reception circuit (wireless communication), a local area network (LAN) terminal and transmission and reception circuit (wired communication), or the like. In addition, the communication unit (not shown) may be a configuration corresponding to an arbitrary standard capable of performing communication such as a universal serial bus (USB) terminal and transmission and reception circuit, or an arbitrary configuration capable of communicating with an external device through a network.

In addition, an example of the network according to the present embodiment may include a wired network such as a LAN or a wide area network (WAN), a wireless network such as a wireless wide area network (WWAN) through a wireless local area network (WLAN) or a base station, or the Internet using a communication protocol such as a transmission control protocolsurasshuInternet Protocol (TCP/IP).

The imaging device 909 is imaging means included in the head mounted display 100 and functions as the imaging unit 103 that generates the captured image by imaging. For example, the imaging device 909 is an imaging element such as a charge-coupled device (CCD) image sensor or a complementary MOS (CMOS) image sensor. The imaging device 909 acquires an image (the captured image) according to incident light on a light receiving surface by outputting a signal having intensity according to an amount of light received for each pixel including the light receiving surface. In addition, for example, the imaging device 909 is provided at a position where it is possible to image the eye with which the light from the light source 101 such as an IR LED is irradiated.

In a case in which the imaging device 909 is provided, in the head mounted display 100, for example, it is possible to performing the processing related to the imaging processing method according to the present embodiment on the basis of the captured image generated by the imaging in the imaging device 909.

For example, the imaging device 909 includes a lens or an imaging element and a signal processing circuit. The lens or the imaging element includes, for example, a lens of an optical system and an image sensor using a plurality of imaging elements such as a complementary metal oxide semiconductor (CMOS).

For example, the signal processing circuit includes an automatic gain control (AGC) circuit or an analog to digital converter (ADC) and converts an analog signal generated by the imaging element to a digital signal (image data). In addition, the signal processing circuit performs various kinds of processing related to, for example, a RAW development. In addition, for example, the signal processing circuit may perform various kinds of signal processing such as white balance correction processing, color tone correction processing, gamma correction processing, YCbCr conversion processing, or edge emphasis processing.

The IR LED 910 is the light source 101 included in the head mounted display 100 and includes a plurality of IR LEDs. For example, the IR LED 910 is provided at the position where the eye of the user is irradiated with the light. Since the light source 101 is a device that emits light other than light of a visible light band as the IR LED 910, even though the eyeball 10 of the user is irradiated with the light from the light source 101, a view of the user is not disturbed. In addition, as described above, the light source 101 included in the head mounted display 100 is not limited to the IR LED, and various optical elements may be applied to the light source 101 as long as the various optical elements are optical elements that emit light.

For example, the head mounted display 100 performs the processing related to the information processing method according to the present embodiment by a configuration shown in FIG. 16. In addition, the hardware configuration of the head mounted display 100 according to the present embodiment is not limited to the configuration shown in FIG. 16.

For example, the head mounted display 100 may not include one or both of the imaging device 909 and the IR LED 910.

In addition, for example, in a case in which the head mounted display 100 is configured to perform processing in a stand-alone state, the head mounted display 100 may not include the communication interface 908. In addition, the head mounted display 100 may not include the recording medium 904, the operation input device 906, or the display device 907.

In addition, the configuration of the head mounted display 100 according to an embodiment of the present disclosure is not limited to the configuration shown in FIG. 3.

For example, a part of the configuration of the head mounted display 100 according to an embodiment of the present disclosure may be provided at the outside.

For example, in a case in which the analysis processing is performed on the captured image information in the external device and the processing is performed using the processing result of the external device, the head mounted display 100 may not include the image processing unit 104.

In addition, in a case in which the processing of associating the light source 101 and the bright spot 15 with each other is performed in the external device and the processing is performed using the processing result of the external device, the head mounted display 100 may not include the collation unit 105.

In addition, in a case in which the processing of the line of sight estimation is performed in the external device and the processing is performed using the processing result of the external device, the head mounted display 100 may not include the line of sight estimation unit 106.

In addition, in a case in which the processing of storing various pieces of information is performed in the external device and the processing is performed using the information stored in the external device, the head mounted display 100 may not include the storage unit 109.

The head mounted display 100 has been described above as an embodiment of the present disclosure, but the embodiment of the present disclosure is not limited to such an embodiment. For example, the embodiment of the present disclosure is able to be applied to various devices capable of processing an image, such as an information processing device such as a personal computer (PC) or a server, a communication device such as a mobile phone or a smartphone, or a tablet type device. In addition, for example, the present embodiment is also able to be applied to one or more integrated circuits (ICs) that are able to be incorporated in the above-described devices.

In addition, for example, the present disclosure may be applied to a system including one or more devices on the premise of connection to a network (or communication between devices) such as a cloud computing. That is, for example, the head mounted display 100 according to an embodiment of the present disclosure described above is also able to be realized as an information processing system including a plurality of devices.

5. Supplement

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the light source control unit 102 may set the luminance of the light source 101 according to illuminance information that is information related to the illuminance of a usage environment of the head mounted display 100 provided from the illuminance detection unit 111.

In addition, the image processing unit 104 analyzes the captured image information, and thus the image processing unit 104 provides captured image illuminance information that is information related to the illuminance of the usage environment of the head mounted display 100 to the light source control unit 102. In addition, the light source control unit 102 may set the luminance of the light source 101 according to the captured image illuminance information.

In addition, the light source control unit 102 may set the luminance of the light source 101 according to the exposure time (shutter speed), a gain, and the frame rate that are parameters related to the imaging processing.

As described above, it is possible to generate the bright spot 15 with the desired brightness by setting the luminance of the light source 101. Therefore, it is possible to accuracy of the association between the bright spot 15 and the light source 101.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a light source control unit configured to control a light source that irradiates an eye with light; and an exposure control unit configured to control exposure for imaging the eye, in which the light source control unit sets a state of the light source to an on state or an off state at a time when the exposure is not performed.

(2)

The information processing apparatus according to (1), in which the light source control unit sets the state of the light source to the on state or the off state at a time when the exposure corresponding to each frame included in a plurality of successive frames in chronological order is not performed.

(3)

The information processing apparatus according to any one of (1) and (2), in which, in a case in which imaging processing information including an end time of exposure corresponding to each frame is acquired, the light source control unit sets the state of the light source to the on state or the off state after the end time of the exposure.

(4)

The information processing apparatus according to any one of (1) to (3), in which, in a case in which imaging processing information including an end time of exposure corresponding to each frame is not acquired, the light source control unit sets the state of the light source to the on state or the off state on a basis of light source control setting information that is correspondence information of an exposure time and an on or off time of the light source.

(5)

The information processing apparatus according to any one of (1) or (2), in which, in a case in which imaging processing information including a completion notification of reading of a captured image or a completion notification of exposure is acquired, the light source control unit sets the state of the light source to the on state or the off state after a time when the completion notification of reading of the captured image or the completion notification of the exposure is acquired.

(6)

The information processing apparatus according to any one of (1) to (5), in which, in a case in which imaging processing information including a start time of exposure corresponding to each frame is acquired, the light source control unit sets the state of the light source to the on state or the off state before the start time of the exposure.

(7)

The information processing apparatus according to any one of (1) to (6), in which, in a case in which imaging processing information including a start time of exposure corresponding to each frame is not acquired, the light source control unit sets the state of the light source to the on state or the off state on a basis of light source control setting information that is correspondence information of an exposure time and an on or off time of the light source.

(8)

The information processing apparatus according to any one of (1) to (7), in which the exposure control unit performs exposure by a rolling shutter method.

(9)

The information processing apparatus according to (8), in which the exposure control unit acquires information related to a predicted bright spot position at which a bright spot that is a reflection point of the light is predicted to appear, and sets the state of the light source to the on state or the off state at a time when the exposure is not performed with respect to a line in a captured image corresponding to the predicted bright spot position.

(10)

The information processing apparatus according to (9), in which, in a case in which there are a plurality of light sources, the exposure control unit sets a timing at which a state of a light source is set to the on state or the off state for each of the light sources.

(11)

The information processing apparatus according to any one of (9) and (10), in which the predicted bright spot position is predicted on a basis of prediction related information including a frame rate, three-dimensional position attitude information of an imaging unit up to a frame that is being subjected to imaging processing, three-dimensional position information of a bright spot up to the frame that is being subjected to the imaging processing, or position information of the bright spot in a captured image up to the frame that is being subjected to the imaging processing.

(12)

The information processing apparatus according to (11), in which the light source control unit sets the state of the light source to the on state or the off state on a basis of predicted bright spot position related information including correspondence information of a line in a captured image corresponding to the prediction related information and the predicted bright spot position.

(13)

The information processing apparatus according to any one of (1) to (12), further including:

an imaging unit configured to image an eye using the light.

(14)

The information processing apparatus according to any one of (1) to (13), in which the light source control unit sets luminance of the light source on a basis of illuminance information that is information related to illuminance detected by an illuminance detection unit, captured image illuminance information that is information related to illuminance generated by an analysis result of a captured image by an imaging processing unit, or a parameter related to imaging processing.

(15)

An information processing method that is performed by an information processing apparatus, the information processing method including:
controlling a light source that irradiates an eye with light;
controlling exposure for imaging the eye using the light; and
setting a state of the light source to an on state or an off state at a time when the exposure is not performed.

REFERENCE SIGNS LIST 100 head mounted display
101 light source
102 light source control unit
103 imaging unit
104 image processing unit
105 collation unit
106 line of sight estimation unit
107 display unit
108 display control unit
109 storage unit
110 exposure control unit
111 illuminance detection unit

The invention claimed is:

1. An information processing apparatus, comprising:
circuitry configured to:
control a light source that irradiates an eye with light;
control exposure for an imaging operation of the eye;
acquire imaging processing information comprising an exposure end time corresponding to each frame of a plurality of successive frames and an exposure start time corresponding to each frame of the plurality of successive frames, wherein the plurality of successive frames is associated with the imaging operation;
determine the exposure end time of a first frame of a plurality of successive frames based on the imaging processing information;
determine the exposure start time of a second frame of the plurality of successive frames based on the imaging processing information, wherein the second frame is successive to the first frame; and
change a state of the light source in a time interval between the exposure end time of the first frame and the exposure start time of the second frame, wherein
the state of the light source is one of an on state or an off state, and
the state of the light source is changed after the exposure end time of the first frame.

2. The information processing apparatus according to claim 1, wherein
the imaging processing information further comprises a completion notification of an exposure operation, and
the circuitry is further configured to change, based on the acquired imaging processing information, the state of the light source to one of the on state or the off state subsequent to a time of acquisition of the completion notification of the exposure operation.

3. The information processing apparatus according to claim 1, wherein the circuitry is further configured to
change, based on the acquired imaging processing information, the state of the light source to one of the on state or the off state before the exposure start time of the second frame.

4. The information processing apparatus according to claim 1, wherein the circuitry is further configured to control exposure by a rolling shutter method.

5. The information processing apparatus according to claim 4, wherein the circuitry is further configured to:
acquire information associated with a predicted bright spot position, wherein
the predicted bright spot position is a position on a captured image,
a bright spot is predicted to appear at the predicted bright spot position, and
the bright spot is a reflection point of the light irradiated on the eye; and
change the state of the light source to one of the on state or the off state at a time when the exposure is not performed with respect to a line in the captured image, wherein the line in the captured image corresponds to the predicted bright spot position.

6. The information processing apparatus according to claim 5, wherein the circuitry is further configured to set a timing at which a state of each light source of a plurality of light sources is changed to one of the on state or the off state.

7. The information processing apparatus according to claim 5, wherein the predicted bright spot position is predicted based on at least one of prediction related information including a frame rate, three-dimensional position attitude information of an imaging unit corresponding to a frame subjected to imaging processing, three-dimensional position information of a bright spot corresponding to the frame subjected to the imaging processing, or position information of the bright spot in the captured image corresponding to the frame that is subjected to the imaging processing.

8. The information processing apparatus according to claim 7, wherein
the circuitry is further configured to change the state of the light source to one of the on state or the off state based on predicted bright spot position related information corresponding to the line in the captured image, and
the line in the captured image corresponds to the prediction related information and the predicted bright spot position.

9. The information processing apparatus according to claim 1, further comprising an imaging unit configured to image the eye based on the light.

10. The information processing apparatus according to claim 1, wherein the circuitry is further configured to set luminance of the light source based on one of illuminance information, captured image illuminance information generated by an analysis result of a captured image, or a parameter related to imaging processing.

11. An information processing method, the information processing method comprising:
controlling a light source that irradiates an eye with light;
controlling exposure in an imaging operation on the eye based on the light;
acquiring imaging processing information comprising an exposure end time corresponding to each frame of a plurality of successive frames and an exposure start time corresponding to each frame of the plurality of successive frames, wherein the plurality of successive frames is associated with the imaging operation;
determining the exposure end time of a first frame of a plurality of successive frames based on the imaging processing information;
determining the exposure start time of a second frame of the plurality of successive frames based on the imaging processing information, wherein the second frame is successive to the first frame; and changing a state of the light source in a time interval between the exposure end time of the first frame and the exposure start time of the second frame, wherein the state of the light source is one of an on state or an off state, and the state of the light source is changed after the exposure end time of the first frame.

12. An information processing apparatus, comprising:
circuitry configured to:
control a light source that irradiates an eye with light;
control exposure for an imaging operation of the eye;
determine an exposure end time of a first frame of a plurality of successive frames associated with the imaging operation;
determine an exposure start time of a second frame of the plurality of successive frames, wherein the second frame is successive to the first frame; and
change, in a case where imaging processing information including the exposure end time is not acquired, a state of the light source in a time interval between the determined exposure end time of the first frame and the determined exposure start time of the second frame based on light source control setting information, wherein the state of the light source is one of an on state or an off state, and the light source control setting information corresponds to an exposure time for each frame of the plurality of successive frames, and one of an on time of the light source or an off time of the light source.

13. An information processing apparatus, comprising:
circuitry configured to:
control a light source that irradiates an eye with light;
control exposure for an imaging operation of the eye;
acquire imaging processing information that comprises a completion notification of an exposure operation;
determine an exposure end time of a first frame of a plurality of successive frames based on the imaging processing information;
determine an exposure start time of a second frame of the plurality of successive frames based on the imaging processing information, wherein the second frame is successive to the first frame; and
change a state of the light source in a time interval between the exposure end time of the first frame and the exposure start time of the second frame, wherein the state of the light source is one of an on state or an off state, and the state of the light source is changed to one of the on state or the off state subsequent to a time of acquisition of the completion notification of the exposure operation.

* * * * *